US007566373B2

(12) United States Patent
Takayama

(10) Patent No.: US 7,566,373 B2
(45) Date of Patent: Jul. 28, 2009

(54) ROLLING MEMBER AND PRODUCING METHOD THEREOF

(75) Inventor: Takemori Takayama, Hirakata (JP)

(73) Assignee: Komatsu Ltd., Tokyo (JP)

( * ) Notice: Subject to any disclaimer, the term of this patent is extended or adjusted under 35 U.S.C. 154(b) by 381 days.

(21) Appl. No.: 11/134,431

(22) Filed: May 23, 2005

(65) Prior Publication Data

US 2005/0257860 A1    Nov. 24, 2005

(30) Foreign Application Priority Data

May 24, 2004 (JP) .............................. 2004-153132
Apr. 28, 2005 (JP) .............................. 2005-131605

(51) Int. Cl.
*C21D 1/10* (2006.01)
(52) U.S. Cl. ...................................... 148/572; 148/680
(58) Field of Classification Search .................. 148/572
See application file for complete search history.

(56) References Cited

U.S. PATENT DOCUMENTS 4,173,501 A * 11/1979 Hildebrandt et al. ........ 148/224
7,083,688 B2 * 8/2006 Asano et al. ................. 148/663

OTHER PUBLICATIONS

"Heat Treatment of Steel: basis and operation standard", Iron and Steel Institute of Japan, Maruzen Co., Ltd., Feb. 20, 1978, p. 110, Table 2.38 and Table 2.39, p. 258, Figure 5.85.
"*Material*", vol. 26, No. 280, pp. 24-29 and 108; 1977.

* cited by examiner

*Primary Examiner*—Roy King
*Assistant Examiner*—Jie Yang
(74) *Attorney, Agent, or Firm*—Wenderoth, Lind & Ponack, L.L.P.

(57) ABSTRACT

A rolling member excellent in pitting strength, spalling strength and bending strength of dedendum has a first quench hardened layer 1 which is formed on a surface layer of the rolling member and has a parent phase taking the form of martensite phase which forms a solid solution with carbon of 0.35 to 0.8 wt %, and a second quench hardened layer 2 which is formed at a deeper layer under the first quench hardened layer and has a parent phase containing at least either one of martensite phase or bainite phase which forms a solid solution with carbon of 0.07 to 0.3 wt % and contains cementite dispersed therein in a content of 2 to 20% by volume.

13 Claims, 27 Drawing Sheets

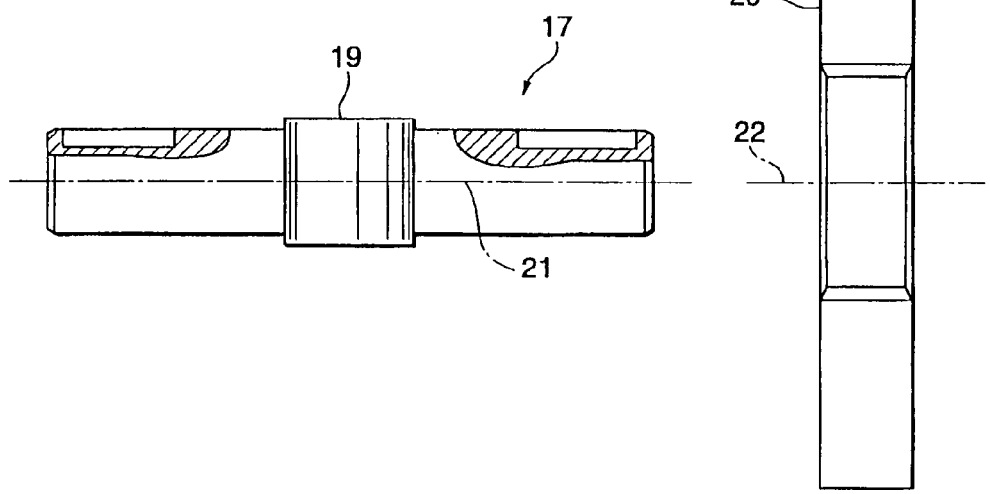

FIG. 25
| | QUENCHING METHOD | HARDENED LAYER |
|---|---|---|
| (a) | QUENCHING ALL TEETH (ONE SHOT) 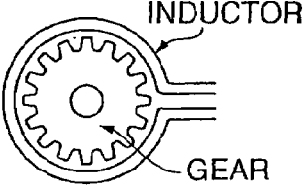 |  |
| (b) | QUENCHING ONE TOOTH (ONE SHOT) 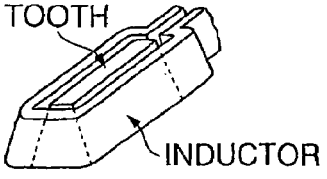 |  |
| (c) | QUENCHING ONE TOOTH (MOVING) 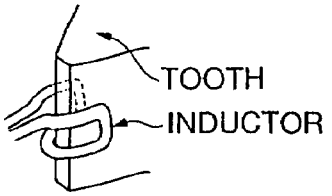 |  |
| (d) | QUENCHING ONE SIDE (MOVING) 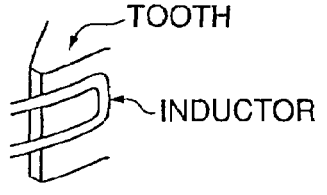 |  |
| (e) | QUENCHING TEETH SPACE (MOVING) 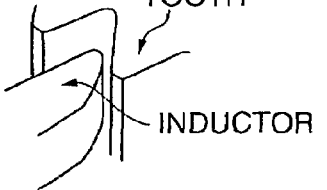 |  |

SINGLE HEATING

DOUBLE HEATING

ROLLING MEMBER AND PRODUCING METHOD THEREOF

FIELD OF THE INVENTION

The present invention relates to a rolling member usable for a gear, a bearing, and a cam shaft which requires abrasion resistance, high bearing stress and high fatigue strength, and a producing method thereof.

BACKGROUND OF THE INVENTION

An induction hardening method applied to a steel is commonly carried out in such a manner that a surface layer of the steel is heated by using an induction current having a frequency of 1 to 400 kHz and then cooled so as to form a hard martensite phase on the surface layer. Such a method is a very general-purposive surface quenching technology and therefore applied to produce a member such as a gear, a spindle, a crankshaft and a camshaft, which requires abrasion resistance, high bearing stress and high fatigue strength.

FIG. 25 is a drawing showing typical induction hardening methods for a gear (as described in Iron and Steel Institute of Japan, "Heat Treatment of Steel", MARUZEN Co. Ltd, (1985.3.1), p 258). From a productive viewpoint, a method (a) for quenching all of the teeth of the gear at once is widely employed. And, as an induction hardening method in which a quench hardened layer is formed by heat inputting along the teeth profile as shown in FIG. 26A and FIG. 26B, a double induction hardening method (as described in the aforesaid reference, P258) and a rapidly heating method by applying a large power in a moment have been studied and utilized.

SUMMARY OF THE INVENTION

In a gear made such that all of the teeth are induction hardened at once as shown FIG. 25A, since the teeth are almost completely quench hardened (through-hardened), tensile residual stress is produced at the teeth flank remarkably, resulting in causing quenching crack and breakage of the teeth. Such a method cannot be applied to a gear to which a high load is applied.

A conventional induction hardened member is made by quenching a carbon steel containing carbon of 0.32 to 0.55 wt %. A low metal alloy steel containing further an alloy element such as Ni, Cr and Mo is likely to cause quenching crack at induction hardening. So, the gear made of the steel containing a carbon in a lower amount has insufficient surface hardness compared with a carburized gear, and therefore cannot meet a need for high bearing stress, abrasion resistance, seizing resistance and high strength (as described in the aforesaid reference, P110, table 2.38 and table 2.39).

Furthermore, when a quench hardened layer is formed along the teeth profile as shown in FIG. 26, a deep portion (for example, heat-affected portion) under the quench hardened layer is not quenched. The unquenched portion has a soft structure comprising ferrite and cementite so as to suit for machining, whereby the portion has insufficient hardness (Vickers hardness of Hv160 to 260) smaller than hardness (Hv260 to 500) of a deep portion under a quench hardened layer of a carburized gear. As a result the gear has insufficient pitting strength (bearing stress) and spalling resistance. And, since the soft raw steel is exposed from the end surface of the teeth, sufficient strength cannot be obtained.

Furthermore, remarkable tensile residual stress is produced at boundaries between the induction hardened layer and the raw material, causing insufficient spalling resistance at the teeth flank.

In order to solve the above-mentioned problem, an object of the present invention is to provide a rolling member excellent in pitting resistance, spalling resistance and bending strength of the dedendum and a producing method thereof.

A rolling member according to the present invention is made such that a steel containing at least carbon of 0.4 to 1.5 wt % is quenched at a surface layer of the steel through a deeper portion under the surface layer to form two or more kinds of quench hardened layers, in which one of said two quench hardened layers has a structure in which cementite is dispersed in 2% or more by volume.

A rolling member in the present invention comprises a first quench hardened layer at a surface layer thereof and a second quench hardened layer at a deeper portion under the first quench hardened layer. The first quench hardened layer has a parent phase taking the form of martensite phase, which is formed by quenching austenite phase forming a solid solution with carbon of 0.35 to 0.8 wt %. And, the second quench hardened layer has a parent phase containing at least either one of martensite phase or bainite phase, which is formed by quenching austenite phase which forms a solid solution with carbon of an amount (for example, 0.07 to 0.5 wt %) lower than that of the austenite phase of the first quenching layer, in which the parent phase contains cementite dispersed therein in 2 to 20% by volume.

A producing method of a rolling member in the present invention comprises a preparing step for preparing a steel, which contains carbon of 0.4 to 1.5 wt % and Cr of 2 wt % or less and has cementite and austenite, in which alloy composition of the cementite is regulated so that the alloy composition is equal to concentrations of the alloy elements in the cementite in said steel at a heating temperature of the succeeding step and activity of carbon in a carbon concentration on a solid soluble line of the cementite to the austenite is lower than activity of carbon contained in the austenite contained in said steel, and a quenching step for induction heating the steel from a surface layer thereof up to two or more temperatures within a range of Ac1 temperature to 1150° C. or Ac3 temperature to 1150° C. and then quenching.

In a producing method of a rolling member according to the present invention, it is possible that the preparing step has a heat treating step for heat treating a steel containing carbon of 0.4 to 1.5 wt % and Cr of 0.3 to 2 wt % so that cementite contained in the steel contains Cr of 3.5 to 12 wt %, and the quenching step is a step for induction heating the steel by two kinds of processes in which a surface layer of the steel is heated up to a high temperature within a range of 900 to 1150° C. and a deep portion under the surface layer is heated up to a low temperature within a range of Ac1 temperature to 950° C. or Ac3 temperature to 950° C. and then quenched.

In a producing method of a rolling member according to the present invention, it is possible that the quenching step is such that a surface layer of the steel is heated up to a temperature within a range of 900 to 1150° C. and then cooled down to a temperature within a range of Ac1 temperature to 950° C. or Ac3 temperature to 950° C., which is lower than the former temperature range, and after being maintained at the temperature so as to heat through a deeper portion under the surface layer, it is quenched. Alternatively, it is also possible that the steel is heated to up to a temperature within a range of Ac1 temperature to 950° C. or Ac3 temperature to 950° C. and maintained at the heating temperature so as to heat through a deeper portion under a surface layer of the steel, then after heating the surface layer up to a temperature within a range of 900 to 1150° C., which is higher than the former temperature, it is quenched.

And, in a producing method of a rolling member according to the present invention, it is possible that the preparing step has a heat treating step for heat treating the steel so that cementite contained in the steel contains Cr of 4 to 11 wt %, and the quenching step is such that the steel is induction heated up to a temperature within a range of Ac1 temperature to 950° C. for 2 to 1000 seconds and further heated up to a temperature within a range of 900 to 1150° C. for 0.1 to 5 seconds and then quenched.

As described above, the present invention can provide a rolling member excellent in abrasion resistance, high bearing stress and high bending strength of the dedendum, and a producing method thereof.

BRIEF DESCRIPTION OF DRAWINGS

FIGS. 8A and 8B are drawings schematically showing structures of induction hardened gears according to the present invention.

FIG. 12A is a drawing showing a structure of a small roller specimen and FIG. 12B is a drawing showing a structure of a large roller specimen.

FIG. 25 is a drawing showing typical induction hardening methods for a gear (as described in Iron and Steel Institute of Japan, "Heat Treatment of Steel", MARUZEN Co.Ltd, (1985.3.1), p 258).

DETAILED DESCRIPTION OF EMBODIMENT OF THE INVENTION

Figure 1:
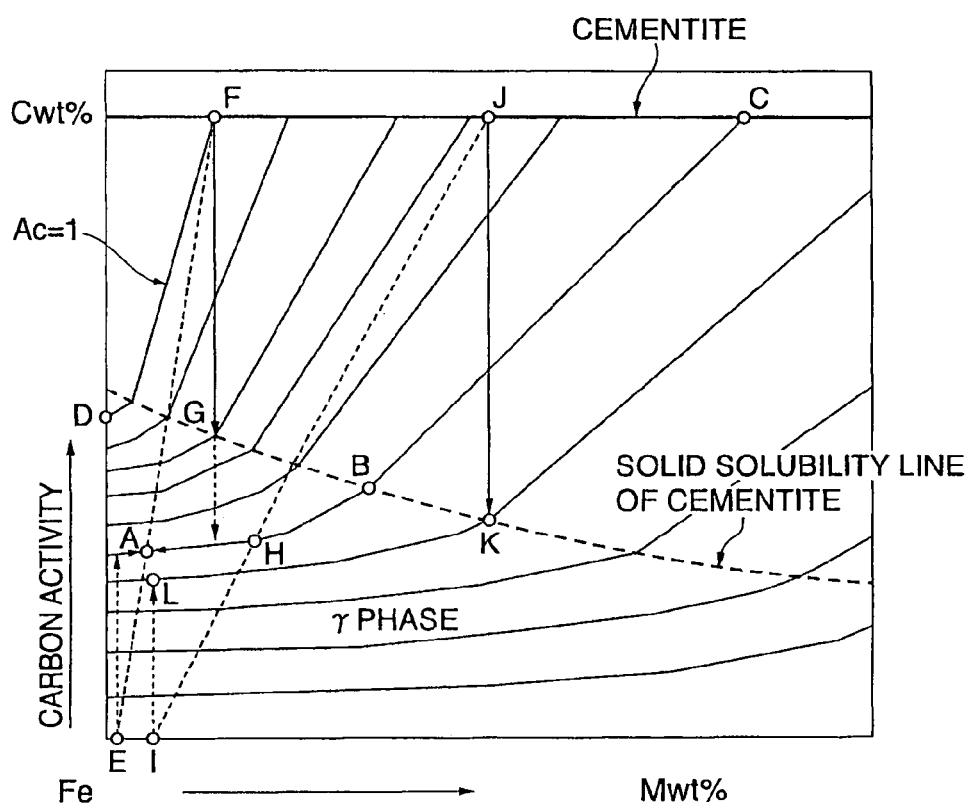
FIG. 1 is a drawing schematically showing a phase diagram of a Fe—C—M ternary alloy and carbon activity lines.

The present invention is for forming two or more kinds of quench hardened layers, which have a parent phase taking the form of at least either one of martensite phase or bainite phase and varying in a solid soluble concentration of carbon from a surface layer to a deeper portion under the surface layer. This can provide a rolling member excellent in abrasion resistance, high bearing stress and high bending strength of dedendum, and a producing method thereof.

A rolling member, according to the present invention, is made such that a steel containing at least carbon of 0.4 to 1.5 wt % and one or more elements of Cr, Mn, V, Mo and W each of 2 wt % or less is induction quenched by two or more kinds of processes so as to form a quench hardened layer. That is, the rolling member comprises a first quench hardened surface layer formed at a surface layer thereof, a second quench hardened layer formed at a deeper portion under the first quench hardened layer and an intermediate layer between the first and second quench hardened layers, in which the second quench hardened layer has a core structure or an unquenched portion remains at a deeper portion under the second quench hardened layer. The first quench hardened layer has a parent phase which takes the form of martensite forming a solid solution with carbon of 0.35 to 0.8 wt %. The second quench hardened layer has a parent phase which contains carbon of a lower amount than that of the parent phase of the first quench hardened layer. Specifically, the second quench hardened layer has a parent phase, which contains at least either one of martensite phase or bainite phase forming a solid solution with carbon of 0.07 to 0.3 wt %, and contains cementite dispersed therein in a content of 2 to 20% by volume without forming a solid solution. And, it is preferable that the upper limit of an amount of carbon is set at 0.3 wt % so that the parent phase is formed by the martensite phase mainly. The intermediate layer has hardness of middle of hardness of the first quench hardened layer and hardness of the second quench hardened layer. And, the unquenched portion has a structure in which cementite is dispersed in ferrite.

In the present invention, it is preferable that the steel contains Cr of 0.3 to 2 wt % so that cementite in the steel contains Cr of at least 3 to 12 wt % concentrated therein. In addition, it is preferable that the steel contains one or more elements of Mn of 0.1 to 2 wt %, Si+Al of 0.05 to 1.5 wt %, Mo of 0.7 wt % or less, W of 1.4 wt % or less, V of 2 wt % or less, Al of 1 wt % or less, Ni of 3 wt % or less, B of 0.01 wt % or less, Ti+Nb+Zr of 1 wt % or less and S of 1.0 wt % or less.

And, in a rolling member according to the present invention, it is preferable that a steel containing at least carbon of 0.5 to 1.5 wt % and Cr of 0.5 to 2 wt % is used so that the first quench hardened layer contains cementite dispersed therein in a content of 2 to 17% by volume and the second quench hardened layer contains cementite dispersed therein in a content of 4 to 20% by volume. In order to improve abrasion resistance, it is preferable that a steel containing carbon of 0.7 to 1.5 wt % and Cr of 0.7 to 2 wt % is used so that the first quench hardened layer contains cementite dispersed therein in 5 to 17% by volume.

And, it is also preferable that the first quench hardened layer contains retained austenite dispersed therein in 10 to 50% by volume.

And, it is preferable that the first quench hardened layer contains one or more compounds of $V_4C_3$, TiC, NbC and ZrC dispersed therein.

And, it is preferable that the steel contains Si+Al of 0.5 to 1.5 wt % and further one or more elements of Mn of 1 to 2 wt %, Mo of 0.05 to 0.7 wt %, V of 0.2 to 1 wt % and Ni+Nb+Zr of 0.1 to 0.5 wt %.

When a rolling member according to the present invention is a gear, the gear has the first quench hardened layer with a thickness of 0.15 to 0.6 times the gear module (m(mm)), a diameter of the gear at the circular pitch/number of the teeth) and a hardened layer which is quenched by the second quenching process so as to have Vickers hardness of Hv260 to 500 higher than hardness of a unquenched portion, the hardened layer being formed at a deeper layer under the first quench hardened layer or a central internal portion of the teeth.

And, when a rolling member according to the present invention is a bearing or a cam shaft, it is preferable that the first quench hardened layer is formed on a surface layer of the member and the second quench hardened layer is formed at a deeper portion under the first quench hardened layer.

In the rolling member, it is preferable that the first quench hardened layer, or both of the first and the second quench hardened layers are tempered at 100 to 350° C.

And, in a rolling member according to the present invention, it is preferable that the first quench hardened layer is treated at a surface layer thereof by a shot peening treatment and the like so as to provide compressive residual stress of 50 kgf/mm$^2$ or more thereto.

Next, a producing method of a rolling member according to the present invention will be explained.

First a steel containing at least carbon of 0.4 to 1.5 wt % and one or more elements of Cr, Mn, V, Mo and W each of 2 wt % or less and having cementite and ferrite, in which alloy composition of the cementite is regulated so that concentrations of the alloy elements in austenite formed at a heating temperature of the succeeding step is equal to concentrations of the alloy elements in the cementite of the steel and activity of carbon in a carbon concentration on a solid soluble line of cementite to the formed austenite is lower than activity of carbon contained in the austenite of the steel is prepared. Then, the steel is induction heated from a surface layer thereof up to two or more temperatures within a range of Ac1 temperature (eutectoid transformation temperature) to 1150° C. or Ac3 temperature to 1150° C., and then quenched. This forms a first quench hardened layer, which has a martensite parent phase forming a solid solution with carbon of 0.35 to 0.8 wt % at a surface layer of the steel, and a second quench hardened layer, which has a parent phase containing at least either one of martensite phase or bainite phase forming a solid solution with carbon of 0.07 to 0.5 wt %, in which the parent phase contains cementite dispersed therein in a content of 2 to 20% by volume without forming a solid solution, at a deeper portion under the first quench hardened layer.

The producing method of a rolling member may further comprise a heat treating step for heat treating a steel containing carbon of 0.4 to 1.5 wt % and Cr of 0.3 to 2 wt % so that cementite contained in the steel contains Cr in at least an amount of 3.5 to 12 wt %. And, it is also preferable that the quenching step has two or more kinds of induction heating processes comprising a step for heating a surface layer of a rolling member made of the steel up to a high temperature within a range of 900 to 1150° C. and a step for heating a deeper portion under the surface layer to a low temperature within a range of Ac1 temperature (eutectoid transformation temperature) to 950° C. or Ac3 temperature to 950° C., and then quenching. This enables to adjust a concentration of carbon which forms a solid solution with each parent phase of the first and the second quench hardened layers.

In addition, it is preferable that the steel contains one or more elements selected from Mn of 0.1 to 2 wt %, Si+Al of 0.05 to 1.5 wt %, Mo of 0.7 wt % or less, W of 1.4 wt % or less, V of 2 wt % or less, Al of 1 wt % or less, Ni of 3 wt % or less, B of 0.01 wt % or less, Ti+Nb+Zr of 1 wt % or less and S of 1.0 wt % or less.

Here, the quenching step for induction heating the steel up to two or more temperatures will be explained in detail. It is also preferable that the steel is rapidly heated up at a surface layer thereof to a temperature within a range of 900 to 1150° C. so as to form the first quench hardened layer and then cooled down to a temperature within a range of Ac1 temperature (eutectoid transformation temperature) to 950° C. or Ac3 temperature to 950° C., which is lower than the former heating temperature, and after being maintained at the temperature so as to heat through a deeper portion under the surface layer and therefore form the second quench hardened layer, then the steel is quenched. Alternatively, it is also preferable that the steel is heated up to a temperature within a range of Ac1 temperature to 950° C. or Ac3 temperature to 950° C. and maintained at the heating temperature so as to heat through a deeper portion under a surface layer and therefore form the second quench hardened layer, and then the surface layer is heated up to a temperature within a range of 900 to 1150° C., which is higher than the former heating temperature, so as to form the first quench hardened layer, and the steel is quenched.

In the present invention, it is preferable that the steel contains at least carbon of 0.5 to 1.5 wt % and Cr of 0.5 to 2 wt %, and the first quench hardened layer contains cementite dispersed therein in a content of 2 to 17% by volume and the second quench hardened layer contains cementite dispersed therein in a content of 4 to 20% by volume. In order to provide abrasion resistance, it is more preferable that a steel contains carbon of 0.7 to 1.5 wt % and Cr of 0.7 to 2 wt % and the first quench hardened layer contains cementite dispersed therein in 5 to 15% by volume.

And, in the present invention, it is preferable that at the induction heating, a period t (sec) for raising a temperature from Ac1 temperature or Ac3 temperature to a quenching temperature T (° C.) is regulated to satisfy the following equation (1), $$t \leq (1350/(T+273))^{28} \quad (1)$$

In the present invention, it is also possible that a steel, which is heat-treated so that cementite in the steel contains Cr in an amount of 4 to 11 wt %, is rapidly induction heated at a temperature within a range of Ac1 temperature to 950° C. for 2 to 1000 seconds and further heated to a temperature within a range of 900 to 1150° C. for 0.1 to 5 seconds, and then quenched so as to form the first quench hardened layer and the second quench hardened layer.

And, it is preferable that the first and second quench hardened layers are tempered at 100 to 350° C.

Furthermore, it is preferable that the first quench hardened layer is treated at a surface layer thereof by a shot peening treatment and the like so as to provide compressive retained stress thereto.

According to the present invention, a rolling member has a quench hardened layer of which a parent phase takes the form of two or more types of martensite phases varied in carbon concentration in a depth direction from a surface layer to a deep portion thereof. Specifically, a first quench hardened layer formed at the surface layer of the member is made to be a hardest quenched layer which has a parent phase taking the form of martensite which forms a solid solution with carbon of 0.35 to 0.8 wt % and has Vickers hardness of Hv550 or more. This allows improving bearing stress (pitting resistance and spalling resistance), bending fatigue strength and abrasion resistance.

And, at a deeper portion under the first quench hardened layer, a second quench hardened layer is formed, which has a parent phase containing at least either one of martensite phase or bainite phase which forms a solid solution with carbon of 0.07 to 0.3 wt %, in which the parent phase contains cementite dispersed therein in a content of 2 to 20% by volume without forming a solid solution. This leads to decrease tensile residual stress which is likely to be produced at boundaries between the first and second quench hardened layers, and therefore increase strength of the base material, whereby fatigue resistant strength such as spalling resistance and torsional stress resistance can be improved. In addition, base strength enough to demonstrate a performance of the first quench hardened layer sufficiently can be obtained. And, dispersing hard cementite in the first quench hardened layer in a content of 2 to 17% by volume can improve abrasion resistance and seizing resistance.

The preferred embodiments of the present invention will be described in detail with reference to accompanying drawings.

In a rolling member according to the present invention, a steel which contains at least carbon of 0.4 to 1.5 wt % and has cementite containing an alloy element such as Cr, Mn, Mo and V quantitatively concentrated therein before quenching is prepared. And, the steel is heated by an induction heating process available for rapid heating up to two or more austenitizing heating temperatures within a range of Ac1 temperature (a eutectoid temperature) to 1150° C. or Ac3 temperature to 1150° C. from a surface layer of the steel through a deep portion under the surface layer, and then quenched. This leads in a formation of a quench hardened layer which has a parent phase taking the form of two or more martensite phases varied in a carbon concentration in the depth direction from the surface layer to the deeper portion. This allows providing excellent bearing stress (pitting resistance and spalling resistance), abrasion resistance and seizing resistance to a gear made of a soft steel (having hardness of Hv160 to 260) excellent in machining.

More especially, the first quench hardened layer formed at the surface layer of the steel is made to be a hardest quenched layer which has a parent phase taking the form of martensite which forms a solid solution with carbon of 0.35 to 0.8 wt % and has Vickers hardness of Hv550 or more. This causes the first quench hardened layer to serves as improving bearing stress, bending fatigue strength and abrasion resistance. And, at a deeper portion under the first quench hardened layer, a second quench hardened layer is formed, which has a parent phase taking the form of at least either one of martensite phase or bainite phase, which forms a solid solution with carbon of 0.07 to 0.3 wt %, and contains cementite dispersed therein in a content of 2 to 20% by volume without forming a solid solution. This improves strength of the base metal for overcoming decreasing of tensile residual stress, which is likely to be produced at boundaries between the first and second quench hardened layers. As a result, fatigue resistance strength such as spalling resistance and torsional stress can be enhanced. In addition, base strength enough to demonstrate a performance of the first quench hardened layer sufficiently can be obtained.

And, hardness of the first quench hardened layer is determined on the fact that a rolling surface of a conventional gear has hardness of Hv550 or more. Accordingly, in the present invention, it is preferable that a concentration of carbon which forms a solid solution with martensite in the first quench hardened layer is set at 0.35 wt % or more, more preferably 0.4 wt % or more.

And, it is preferable that the upper limit of a concentration of carbon which forms a solid solution with martensite in the first quench hardened layer is set at 0.9 wt % in order to prevent quenching crack at quenching and in terms of a concentration of carbon in a carburized gear, more preferably 0.8 wt % for toughness.

Between the first and second quench hardened layers, an intermediate layer is formed. In addition, a deeper portion under the second quench hardened layer may be not quenched and therefore have a structure in which cementite is dispersed in ferrite, because such the deeper portion is not applied with a load.

It is preferable that the steel contains one or more elements such as Cr, Mn, Mo, V and W, having an intensive behavior to be concentrated in cementite and therefore decrease activity of carbon in austenitized austenite (a behavior in which carbon is attracted to the element in austenite). Especially, when a steel necessarily contains Cr which has the more intensive behavior and more excellent economical efficiency, it is preferable that the steel contains at least carbon of 0.4 to 1.5 wt % and Cr of 0.3 to 2 wt % and further one or more elements of Mn of 0.1 to 2 wt %, Si+Al of 0.05 to 1.5 wt %, Mo of 0.7 wt % or less, V of 2 wt % or less, Al of 1 wt % or less, Ni of 3 wt % or less, B of 0.01 wt % or less and Ti+Nb+Zr of 1 wt % or less, and cementite in the steel contains Cr concentrated therein in an amount of 3 to 12 wt %. And, using such the steel enables to regulate a concentration of carbon which forms a solid solution with martensite which is formed by adjusting an induction heating temperature at induction quenching.

And, in a rolling member accompanied with sliding, such as a gear, dispersing hard carbide such as cementite in a small amount in a rolling surface thereof improves seizing resistance and abrasion resistance so as to prevent a local seizing at sliding. Accordingly, in the present invention, the first quench hardened layer contains cementite dispersed therein in a content of 2 to 17% by volume so as to improve abrasion resistance and seizing resistance of a rolling surface accompanied with sliding. In such a case, it is preferable that the steel contains carbon of 0.5 to 1.5 wt % and Cr of 0.4 to 2 wt %, in which each amount is converted from an amount of dispersed cementite and a concentration of carbon in the martensite phase. Hard special carbide as well as cementite includes $V_4C_3$, TiC, NbC and ZrC. Accordingly, in the present invention, it is preferable that the steel contains V less than 2 wt % and Ti+Nb+Zr less than 0.5 wt % or less, more preferably V of 0.2 to 1 wt % and Ti+Nb+Zr of 0.1 to 0.5 wt % from an economical viewpoint.

In addition, remaining the cementite particles and the special carbide is effective for making austenite crystal grain austenitized by induction heating and martensite blade formed by quenching to be a fine-grained particles. In a carbon steel for induction quenching, such austenite crystal grain is likely to coarse to have ASTM No. 7 or less at 875° C. or more. On the contrary, in the present invention, such austenite crystal grain is formed to be a fine-grained particles of ASTM No. 9 or more.

When an induction quenched member is a gear, it is required that the teeth of the gear have hardness with a distribution corresponded to a distribution of stress applied to the teeth flank and the dedendum. Accordingly, in view of a carburized quenched gear, in the present invention, the first quench hardened layer having a depth of 0.15 to 0.6 times the gear module is formed at the teeth flank on the circular pitch and the second quench hardened layer having Vickers hardness of Hv260 to 500 is formed at a deeper portion under the first quench hardened layer or a center internal portion of the teeth. And, the second quench hardened layer has a parent phase containing either one of martensite or bainite, in which a concentration of carbon in the parent phase is adjusted to 0.07 to 0.5 wt %. More preferably, the second quench hardened layer has a parent phase formed by martensite in which a carbon concentration is adjusted to 0.07 to 0.3 wt %.

In a rolling member used under a high pressure, a pitting strength becomes higher as the hardness of the rolling surface thereof is harder. Such a case, however, raises a problem in which pitting occurs owing to contamination entered in the rolling surface and insufficient conformability between the rolling members. To solve the problem, it is effective to disperse retained austenite in a suitable amount. Accordingly, in the present invention, it is preferable that the first quench hardened layer contains retained austenite dispersed therein in a content of 10 to 50% by volume. The upper limit of a content of retained austenite is set at 50% by volume, because when a content of the retained austenite exceeds 50% by volume, the hardness of the rolling surface decreases and therefore abrasion resistance decreases.

And, in a gear used under a high pressure and a high stress, in order to improve bending strength of the dedendum, bearing stress and torsional stress of the axial portion, it is preferable that a surface of the quench hardened layer is applied with a shot peening treatment and the like so as to provide compressive residual stress thereto. Accordingly, in the present invention, a rolling member is preferably applied to a shot peening treatment.

In this case, it is presumed that the bending fatigue strength of the dedendum can be improved to such a degree of ½ times the compressive residual stress to be applied. Accordingly, in a rolling member according to the present invention, it is preferable to apply compressive residual stress of 50 kgf/mm² or more.

The present invention is for forming the first quench hardened layer and the second quench hardened layer in such a manner that a rapidly induction heating up to two or more temperatures produces austenite phase and then an amount of a cementite dispersed before quenching previously is regulated such that an adequate amount of the cementite forms a solid solution with the austenite phase and also an adequate amount of the cementite remains (without forming a solid solution). A method for regulating each amount of the cementite is studied by the following mechanism. A solid solution formation of cementite delays remarkably from a point, at which activity of carbon (activity of carbon on a solid solubility line of cementite with austenite, a point K in FIG. 1) in austenite phase having the same alloy composition as that of cementite in a steel at a predetermined austenitizing heating temperature is lower than activity of carbon (a point H in FIG. 1) in austenite phase having the alloy composition. An austenitizing condition in a short period forms a solid solution of cementite in an amount of cementite containing alloy element which forms a solid solution with austenite. And, the same amount of carbon rapidly diffuses in austenite along a carbon activity line (a carbon activity line passing a point K and a point L in FIG. 1) of austenite having the same solid solubility. This enables to regulate a concentration of carbon in martensite parent phase of a quench hardened layer by using an austenitizing temperature and concentrations of alloy elements in cementite.

Accordingly, in the present invention, it is preferable that a steel having a previously regulated alloy element composition is austenitized by heating up to two or more temperatures within a range of Ac1 temperature (eutectoid transformation temperature of the steel) to 1150° C. or a range of Ac3 temperature to 1150° C., for example, a rolling surface of the steel is heated at 1000° C. and then a deeper portion under the rolling surface is induction heated at 800° C. while being cooled. As a result, a concentration of carbon which forms a solid solution with martensite of the first quench hardened layer is higher than that of the second quench hardened layer. This enables to form a first quench hardened layer having improved in hardness and a second quench hardened layer with a low carbon concentration and having toughness at a deeper portion under the first quench hardened layer. Accordingly, a gear having the same hardness distribution of a carburized gear can be produced by an induction quenching method.

Hereinafter, a mechanism (rate) in which cementite forms a solid solution with austenite will be described in detail. In order to regulate a concentration of carbon which forms a solid solution with martensite (i.e., in order to regulate an amount of remaining cementite) by delaying forming a solid solution of cementite, it is necessary to add one or more elements of Cr, Mn, V, Mo and W, which are concentrated in cementite remarkably by heating up to at least either one of a ferrite+cementite two phase region or a austenite+cementite two phase region and decrease activity of carbon in austenite. Especially, Cr is more preferred in these elements. Thereinafter, a regulating method by the addition of Cr or an element showing the same performance as Cr will be explained.

For example, in a ferrite+cementite two phase region sufficiently heated at 700° C., a concentration of Cr in the cementite is 28 times that in the ferrite (when heated at 600° C., about 52 times). A solid solution formation mechanism (a solid soluble rate), in which cementite concentrated with Cr or an element showing the same performance as Cr forms a solid solution with austenite during heating by a quenching process accompanied with rapidly heating, is explained by a relation between a phase diagram of a Fe—C—M (M: an alloy element) ternary alloy at a heating temperature shown in FIG. 1 and constant carbon activity lines shown in FIG. 1.

FIG. 1 is a drawing schematically showing a phase diagram of a Fe—C—M ternary alloy at the induction heating temperature, to which Cr or an element showing the same performance as Cr (such as Cr, Mn, Mo, V and W), each of the element having high affinity with carbon, is added. Carbon activity lines are represented by tine lines in FIG. 1. Carbon activity equal to activity of carbon in austenite phase (γ phase) of a steel having a alloy composition represented by a point A in FIG. 1 changes upward, represented by a thin line in FIG. 1, because carbon activity decreases as an addition amount of the alloy element M increases. Then, the carbon activity line crosses with a line showing solid solubility of cementite at a point B, and then linearly connected at a point C showing a composition of cementite containing an alloy element M at equilibrium with the crossing point (the point B).

Another carbon activity lines (as represented in thin lines) in FIG. 1 are determined according to each carbon activity. Carbon activity becomes higher as its carbon concentration increases. Here, carbon activity Ac is defined as 1 at a point D showing solid solubility of graphite along a Fe—C axis (a phase diagram of a Fe—C binary alloy).

Compositions of ferrite and cementite in the steel before quenching, having the alloy composition shown at the point A in FIG. 1, are shown in a point E and a point F, respectively. Carbon activity at the point G, showing a composition of an austenite boundary at local equilibrium with a cementite boundary when the cementite having the composition of the point F rapidly heated to a quenching heating temperature is transformed such that the alloy element M remains while carbon having significant high diffusion ability forms a solid solution with austenite rapidly, is larger than the carbon activity of the alloy composition of the point A. Thus, carbon diffuses rapidly due to a gradient of chemical potential of carbon. Then, at a region where cementite has formed a solid solution and regions where were being originally ferrite, carbon is first homogenized along an activity line passing the point A and the point B, as shown in arrows in the figure, and then the alloy element is second homogenized.

A diffusion process of carbon and an alloy element at which cementite containing an alloy element rapidly forms a solid solution will be explained by using a diffusion process of spheres of which the composition differs, because the diffusion process of spheres closely resembles the diffusion process of carbon and an alloy element.

Figure 2:
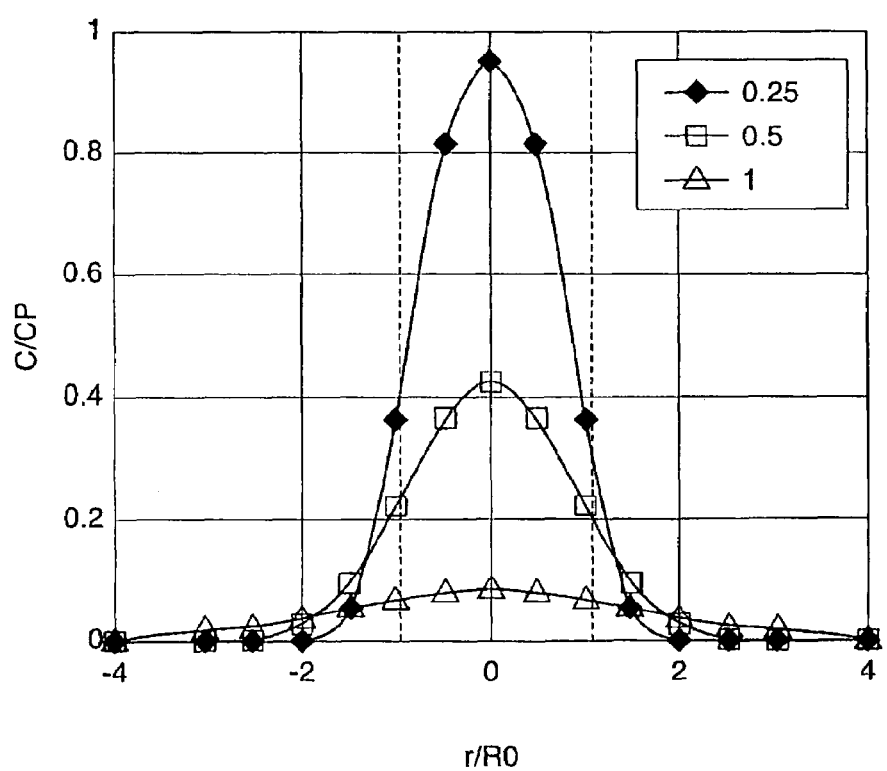
FIG. 2 is a graph showing a relation between a concentration c of an alloy element and a distance r in the radius direction.

In a process in which a sphere having an alloy element concentration cp and a radius R0 is homogenized in an infinite solid parent phase containing no alloy elements, a concentration c of the alloy element for a distance r in the radius direction is obtained by calculation. FIG. 2 is a graph showing a relation between a concentration c of an alloy element and a distance r in the radius direction. When such the result is applied to a homogenizing process of carbon and an alloy element when cementite forms a solid solution with austenite, heating periods $t_C$ and $t_M$ in which carbon and an alloy element are homogenized perfectly, respectively, are approximately calculated using a period in which diffusion lengths $((D^\gamma_C \times t_C)^{1/2}, (D^\gamma_M \times t_M)^{1/2})$, obtained by calculation using diffusion coefficients $D^\gamma_C$, and $D^\gamma_M$ of carbon and an alloy element in austenite phase at the heating temperature, respectively, become equal to a particle radius R of granulated cementite (as shown in Δ of FIG. 2). For example, at 900° C., carbon is mostly homogenized while cementite having a radius of 0.2 μm forms a solid solution within 0.1 second, on the contrary, homogenizing an alloy element requires about 50 minutes (2835 seconds). And, in a case of the alloy element with a diffusion length ¼ times a radius (under a heating condition of a heating temperature of 900° C. and a heating period of 177 seconds), as shown in ♦ of FIG. 2, the alloy element diffuses only within an area where cementite had formed a solid solution, because of small diffusability of the alloy element.

Figure 3:
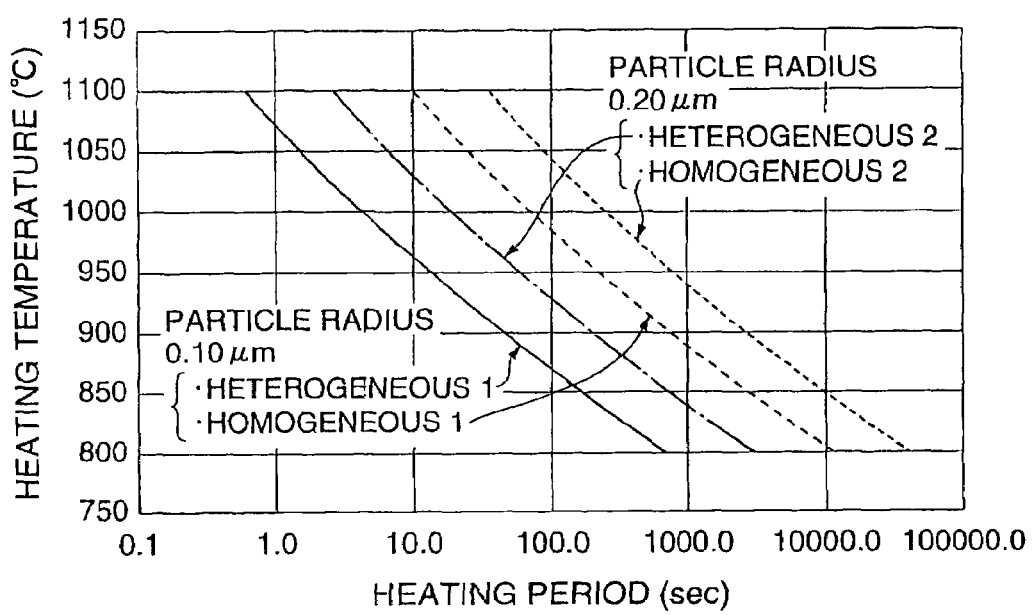
FIG. 3 is a graph showing a relation between a heating period and a heating temperature when spherical cementite which forms a solid solution is homogenized.

In addition, heating periods at various heating temperatures under a heating condition (as shown in ♦ of FIG. 2), in which a diffusion area of the alloy element is limited to an area where cementite had existed, are obtained and represented by heavy lines in FIG. 3. When quenched after heating at temperatures under the heavy line in FIG. 3, even after cementite forms a solid solution rapidly, the alloy element concentrated in the cementite is not homogenized rapidly but localized at the periphery of the cementite. For example, when Mn, Cr and Mo, are localized at an area where cementite had formed a solid solution, hardenability of a steel decreases remarkably. And, as a radius of cementite becomes small as 0.1 μm, a heating condition range becomes narrower, as shown in FIG. 3, resulting in a need for rapidly heating to a quenching temperature.

In the figure, a solid line showing a radius 0.1 μm and heterogeneous 1 is approximately shown by an equation $t_M = (1350/(273+T))^{28}$, and a solid heavy line showing a radius 0.2 μm and heterogeneous 2 is approximately shown by an equation $t_M = (1415/(273+T))^{28}$. And, the heterogeneous period $t_M$ (sec) is approximately shown by the following equation using a heating temperature T(° C.) and a radium R(μm) as variables, $$t_M = ((98.794 \times Ln(R) + 1576.6)/(273+T))^{28}.$$

As described above, carbon has remarkable high diffusabiliy so as to be homogenized for a short heating period as 0.1 second at 900° C. Accordingly, in a temperature range of Ac1 or Ac3 temperature to 1150° C., even in cementite having a radius of 1 μm, heating for about two seconds causes carbon to diffuse rapidly along a carbon activity line passing a point A and a point B in FIG. 1. And, cementite dose not remain in martensite parent phase without forming a solid solution. In this case, a concentration of carbon which forms a solid solution with the martensite phase is given by a concentration of carbon on the carbon activity line passing the point A and the point B of a alloy composition shown at a point E, and sometimes equal to a concentration of carbon of the steel.

Referred to FIG. 1, when a large amount of the alloy element M is added in the steel (a point H) and therefore a large amount of the alloy element M concentrates in the cementite (a point J), cementite rapidly forms a solid solution with austenite according to a carbon diffusion rate controlled step while the alloy element remaining and then changes to a point K in austenite containing an amount of alloy element of a point J. And, carbon diffuse rapidly to have a concentration of a point L along a carbon activity line passing a point K. Since carbon activity at a point K is lower than that of a point H, a solid solution formation of cementite proceeds. And, cementite cannot form a solid solution without an alloy element being diffused to a point B along a cementite solid soluble line during all of the cementite forms a solid solution. This shows that a solid solution formation of cementite delays according to an alloy element diffusion rate controlled step.

Accordingly, it is found that a period necessary for forming a solid solution of all of the cementite becomes longer, as a concentration of the alloy element M in the cementite becomes larger than a concentration of the alloy element M at the point B. However, since carbon diffuses for a short period along a carbon activity line as described above, a concentration of carbon which forms a solid solution with martensite phase quenched after the heating for a short period is given by a concentration of carbon at a point L on a carbon activity line passing a point K. Cementite having the same solid soluble concentration forms a solid solution, resulting in obtaining a quench hardened layer which contains cementite, having a carbon concentration equal to a difference between a carbon concentration in the steel and the solid soluble concentration of carbon, dispersed therein without forming a solid solution. Accordingly, in order to regulate a concentration of carbon in martensite, it is preferable that an induction hardening is carried out by controlling a quenching temperature (a austenitizing temperature) and a concentration (a point J) of the alloy element in cementite in a phase diagram of a Fe—C—M ternary alloy at the temperature so as to be heated such that cementite remains while diffusing carbon sufficiently A composition of region, where cementite forms a solid solution around cementite which diffuses and does not form a solid solution, has substantially the same composition as that at the point K in figure. The alloy element concentration of the region is significantly higher than those of the point L and the point H, and therefore a carbon concentration becomes higher. Accordingly, a martensite transformation temperature Ms of the regions moves to lower so that retained austenite phase excellent in toughness and conformability is easily formed around the cementite which does not form a solid solution. This is preferred for toughness.

A concentration (a point E, a point I) of the alloy element in martensite phase in FIG. 1 heated at a ferrite+cementite two phase region is shown by the following equation, using a concentration [M(wt %)] of the alloy element in cementite and a concentration <M(wt %)> of the alloy element in ferrite, $M(\text{wt \%})=(1-f)\times<M(\text{wt \%})>+f\times[M(\text{wt \%})], f=\text{carbon (wt \%)}/6.67$, (f means a dispersion content (% by volume) of cementite and is obtained on the assumption that a solid solubility of carbon with ferrite is vanishingly small.)

Accordingly, when a concentration [M(wt %)] of the alloy element in cementite is previously obtained, a concentration <M(wt %)> of the alloy element in ferrite can be obtained by using a concentration (M(wt %)) of the alloy element M to be added.

A ratio (a distribution coefficient :αKM) of a concentration [Mwt %] of an alloy element M in cementite to a concentration <Mwt %>of an alloy element M in ferrite, when sufficiently heated at a cementite+ferrite two phase region, is inherent in each of the alloy elements and dependent to a temperature. Therefore, a concentration of an alloy element in ferrite can be obtained by the following equation using a distribution coefficient of each alloy element and a composition of a steel (and a heating temperature), $\alpha KM=[M(\text{wt \%})]/<M(\text{wt \%})>$.

Accordingly, by calculating a concentration of each alloy element contained in a steel, a concentration of carbon in austenite at a austenitizing temperature during quenching heating can be obtained, and therefore hardenability (DI value) can be also obtained. In the case, the DI value is lower than a DI value showing a concentration (a point A and the point H) of the alloy element M in the steel in FIG. 1.

And, when cementite forms a solid solution with austenite rapidly, a concentration of carbon in austenite becomes equal to a concentration of carbon in the steel. In such a case, since the alloy element is localized at the periphery of the area where cementite had formed a solid solution, a concentration of the alloy element in austenite closely resembles a concentration of an alloy element in ferrite in the steel before quenching. Therefore, a DI value can be obtained by calculation. In such a case, it is found that hardenability decreases remarkably.

In addition, in a case of hardenability of austenite in which cementite remains without forming a solid solution, since a concentration of carbon in austenite is lower than that in the steel, the DI value is likely to lower than that of the steel.

And, by using a steel containing alloy elements each having regulated amount in cementite and also by selecting two or more austenitizing temperatures, according to the present invention, two or more concentrations of carbon and the alloy element in austenite are regulated so that hardenability of each of the first and second quench hardened layers can be regulated. And, in a case of a large size gear, it is important that a DI value is previously adjusted so that the second quench hardened layer formed at a deeper portion has a parent phase taking the form of martensite or bainite. For a method for regulating a DI value, it is preferable to add mixing alloy elements such as Mn, Mo and W, having a relatively small tendency to concentrate in cementite. Alternatively, it is more preferable to add Si, Al, Ni and Co, discharging from cementite and concentrating in ferrite, so as to enhance hardenability.

Figure 4:
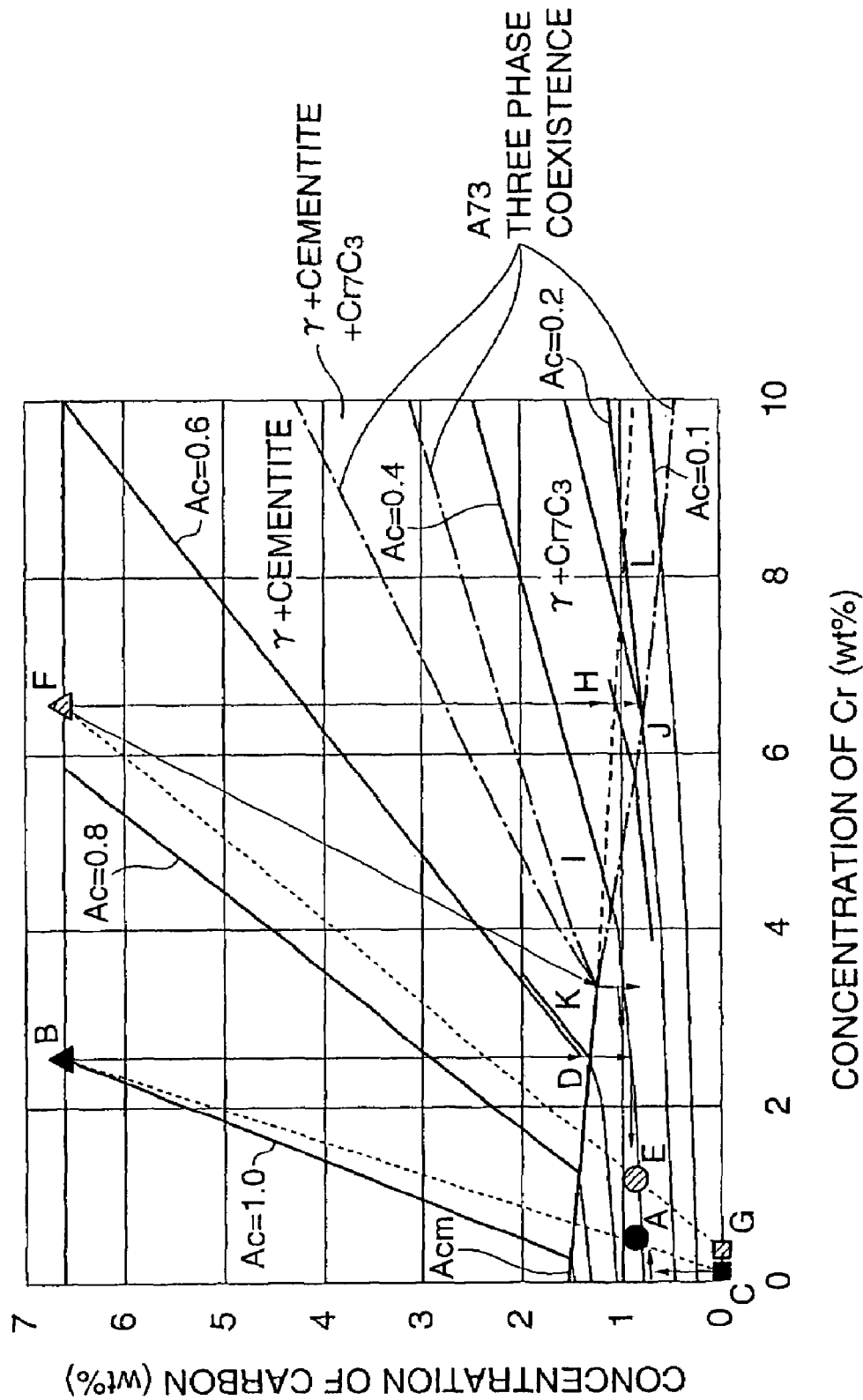
FIG. 4 is a drawing showing carbon activity lines of a Fe—C—M ternary alloy.

In order to study the mechanism of a solid solution formation of cementite in more detail, an induction hardening process in which a quenching treatment is carried out by rapidly heating at 1000° C. will be studied by using constant carbon activity lines (at 1000° C.) of a phase diagram of a Fe—C—Cr ternary, as shown in FIG. 4.

(1) A case in which cementite rapidly forms a solid solution (a case in which a concentration of Cr in cementite is low).

When a steel shown as the point A of the figure (carbon of 0.8 wt % and Cr of 0.4 wt %) is sufficiently heated at 700° C. in the region in which cementite coexists with ferrite, the steel is transformed to have a composition of the point B (cementite, Cr of 2.6 wt %) and the point C (ferrite, Cr of 0.09 wt %). Then, when the steel having the transformed composition is rapidly heated by induction heating to a temperature of 1000° C. at which the steel becomes an austenite state, the point B and the point C transfer toward the point A, along the arrows in the figure, causing the ferrite and the cementite to be homogenized. As described above, carbon rapidly diffuses, as shown in arrows of the figure, in the austenite (the point C) which had originally a ferrite structure via the point D during the alloy element contained in the cementite of the point B is hardly diffused in the austenite. After the cementite has formed a solid solution, Cr is gently homogenized toward the point A along the carbon activity line passing through the point A with diffusion. And, at a point in which the cementite forms a solid solution completely by more rapidly induction heating, a carbon concentration of martensite parent phase becomes equal to that of the point A, obtaining martensite having higher hardness. When a concentration of carbon which forms a solid solution with martensite phase is 0.8 wt %, according to the present invention, a concentration of Cr in cementite is about 4.5 wt %. From this, by adjusting a concentration of Cr in cementite to be at least 4.5 wt %, cementite does not remain without forming a solid solution. In such a case, hardenability (DI value) of austenite is obtained by calculation using a composition of iron, carbon of 0.8 wt % and Cr of 0.09 wt %. The obtained DI value is smaller than that of a steel (iron, carbon of 0.8 wt % and Cr of 0.4 wt %).

(2) A case 1 in which a solid solution formation of cementite drastically delays.

When a steel shown as the point E of the figure (carbon of 0.8 wt % and Cr of 1 wt %) is sufficiently heated at 700° C. in the region in which cementite coexists with ferrite, the steel is transformed to have a composition of the point G (ferrite, Cr of 0.24 wt %) and the point F (cementite, Cr of 6.61 wt %). Then, when the steel having the transformed composition is rapidly heated by induction heating to 1000° C., ferrite is changed to a austenite state and carbon diffuses while a part of cementite forms a solid solution rapidly along a carbon activity line passing a point H having the same Cr concentration as a point F according to a carbon diffusion rate controlled step. A period, in which carbon diffuses in austenite phase along the carbon activity line and is homogenized therewith, is expected to be within 1 second at 900° C. when considering that cementite having a radius of 0.2 μm is diffused and homogenized within 0.1 second at 900° C. and a period in which alloy element is heterogenized shown in FIG. 3. After being cooled at the state, a concentration of carbon in martensite is determined by a concentration of Cr in cementite. From the result, a concentration of carbon in martensite phase after quenching is about 0.5 wt % (cementite in a content of 7.5 wt % by volume forms a solid solution according to a carbon diffusion rate controlled step). This shows that a very hard martensite contains cementite dispersed therein in a content of about 5% by volume without forming a solid solution. A DI value of the induction quenched austenite is obtained using a composition Fe, carbon of 0.5 wt % and Cr of 0.24 wt %. The obtained DI value is smaller than a homogenized steel (iron, carbon of 0.8 wt % and Cr of 1.0 wt %).

Figure 16A:
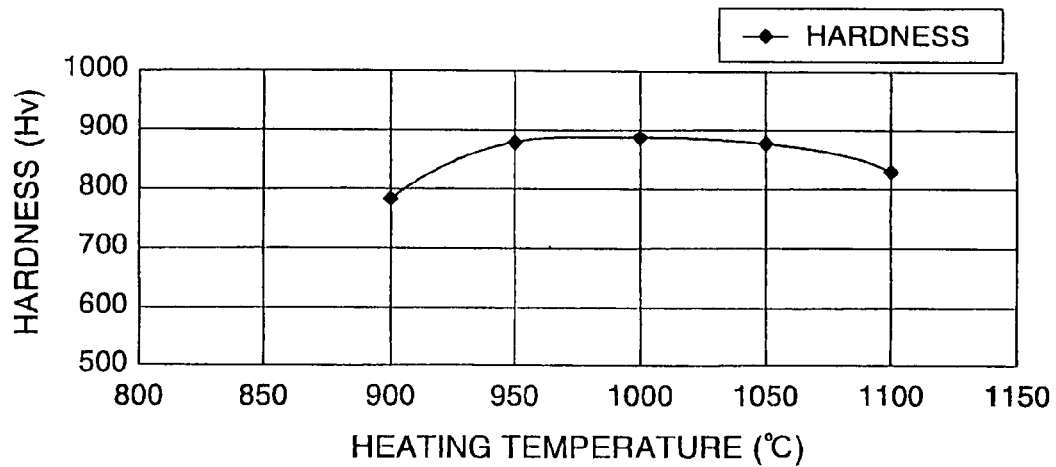
FIG. 16A is a graph showing a relation between a heating temperature and a hardness and FIG. 16B is a graph showing a relation between a heating temperature and an amount of retained austenite.
Figure 16B:
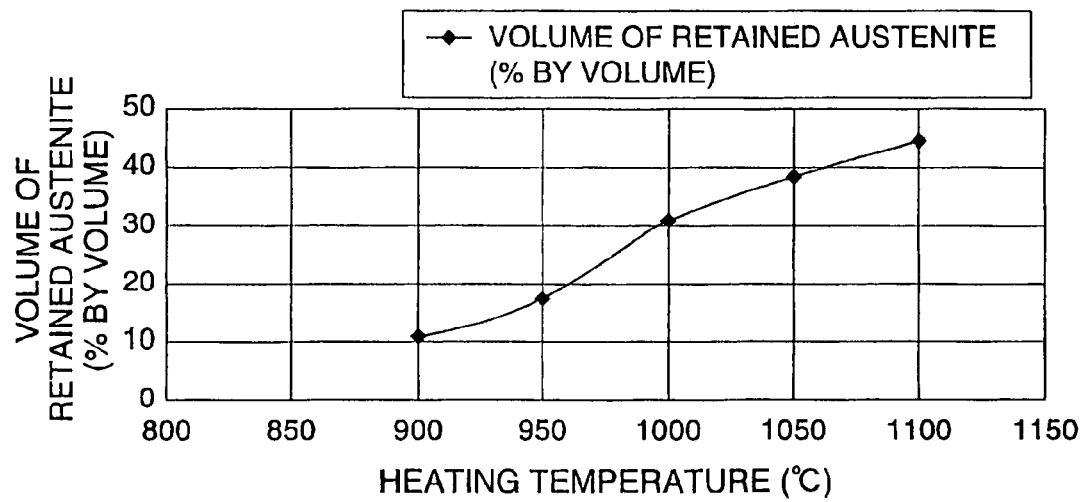

A quench hardened layer of which SUJ3 steel (about 6.8 wt % Cr in cementite), which is rapidly heated to 1000° C. at a heating rate of 1000° C./sec and then quenched, has retained austenite containing carbon of a concentration of 0.97 wt %. This is well agreed with a composition of a H point of the SUJ3 at 1000° C. This shows that the solid solution formation of cementite proceeds according to the carbon diffusion rate controlled step. This is confirmed by the fact that retained austenite phase in a content of 10 to 45% by volume is formed at a temperatures range of 900 to 1100° C. as shown in FIG. 16 described above.

Figure 5:
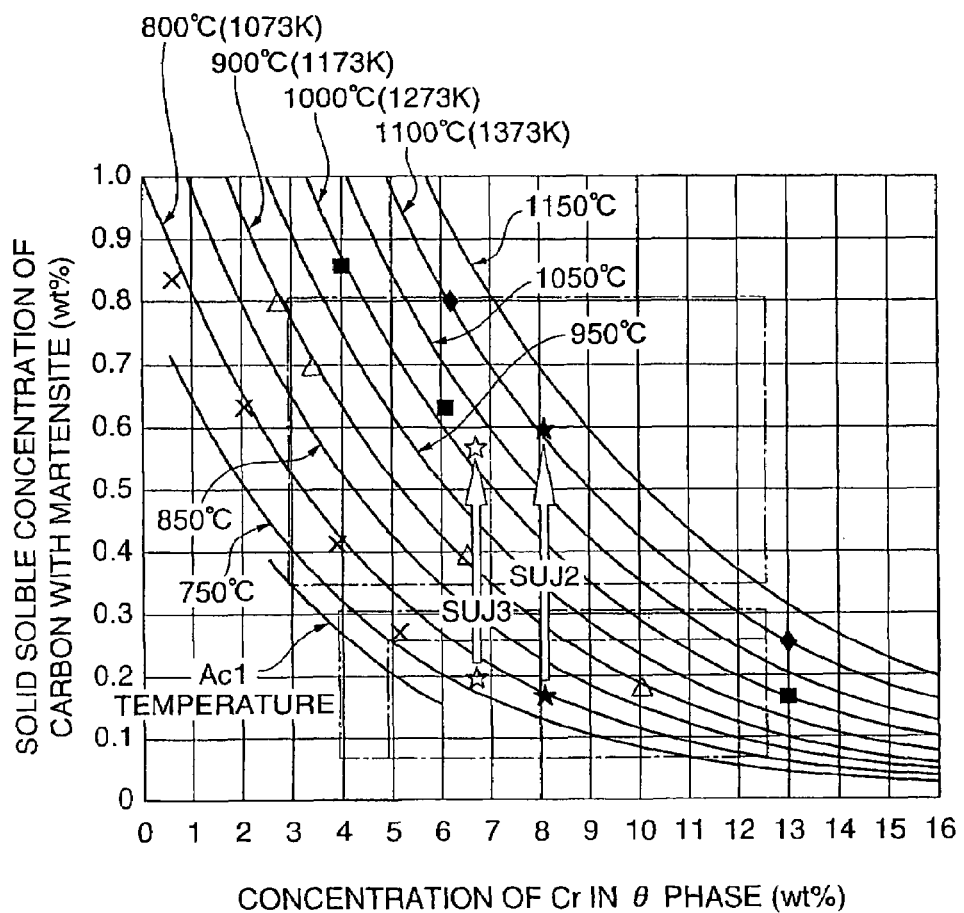
FIG. 5 is a graph showing a relation between a concentration of Cr in cementite and a concentration of carbon which forms a solid solution with martensite phase at various heating temperatures within a range of 750 to 1150° C.

FIG. 5 is a graph showing a relation between a concentration of Cr in cementite and a concentration of carbon which forms a solid solution with martensite phase at various heating temperatures within a range of 750 to 1150° C. From this graph, regulating a heating temperature can regulate a concentration of carbon which forms a solid solution with martensite phase and therefore can regulate an amount of cementite to be dispersed correctly. For example, when a rolling surface of a gear is heated at 1000° C. for a short period and then induction heated at 800° C. through a deeper portion under the rolling surface and quenched, the heating at 1000° C. forms a first quench hardened layer which has a parent phase taking the form of martensite with a high carbon concentration and the heating at 800° C. forms a second quench hardened layer which has a parent phase taking the form of martensite with a low carbon concentration through a deeper portion under the first quench hardened layer.

A relation between a concentration $X_{Cr}^{\Theta}$ (wt %) of Cr in cementite containing carbon of 0.1 to 0.8 wt % and Cr of 0.5 to 15 wt % and a concentration $X_C^M$ (wt %) of carbon which forms a solid solution with martensite, shown in FIG. 5, is shown by the following equation and represented by a thin line in the figure, $$X_C^M = A\exp(B \cdot X_{Cr}^{\Theta}),$$

$$A = 0.0041(T+273) - 3.3809$$

$$B = 0.000188(T+273) - 0.426,$$

here, T means a heating temperature.

The equation provides $X_C^M$ (wt %) with an accuracy of ±0.05 wt % of carbon.

When a martensite phase of a first quench hardened layer, which is formed by heating at a temperature within a range of Ac1 temperature (725° C.) to 1150° C. for a short period, forms a solid solution with carbon of 0.35 to 0.8 wt %, a concentration range of Cr in cementite thereof is shown in a broken line frame at the upper part of FIG. 5. This figure shows that a concentration range of carbon in the cementite is about 3 to 12.5 wt % is order to adjust a concentration of carbon in the martensite phase to be 0.35 to 0.8 wt %. And, when the quenching heating temperature is changed to a temperature within a range of Ac temperature to 1125° C., it is found that a concentration range of carbon in cementite is 3.5 to 12 wt % in order to obtain a second quench hardened layer having martensite which forms a solid solution with carbon of 0.07 to 0.3 wt % and a first quench hardened layer. More preferably, in order to obtain the second quench hardened layer having martensite with a carbon concentration of 0.07 to 0.2 wt % and the second quench hardened layer having martensite with a carbon concentration of 0.4 to 0.8 wt %, a concentration of Cr in the cementite is set at 4 to 11 wt %. And, when a temperature for forming a second quench hardened layer is too high, deformation and heat crack of a gear is likely to occur, whereby it is preferable that the upper limit of a heating temperature for forming a second quench hardened layer is set at 950° C. And, when the upper limit of a heating temperature for forming a first quench hardened layer is set at 1100° C., it is preferable that the upper limit of a concentration of Cr in the cementite is set at 10 wt %. And, when the lower limit of a heating temperature for forming a second quench hardened layer is set at 750° C., it is preferable that the lower limit of a concentration of Cr in the cementite is set at 4 wt %. In order to improve workability of hardening, it is possible that a concentration of Cr in cementite is set at 4 to 10 wt %, a heating temperature for forming a second quench hardened layer is set at 750 to 950° C. and a heating temperature for forming a first quench hardened layer is set at 900 to 1100° C.

And, after cementite forms a solid solution (about 7.5% by volume cementite) according to the carbon diffusion controlled rate step, since a carbon activity at a point H in FIG. 4 (austenite boundaries having a carbon activity equal to that of cementite which forms a solid solution) is lower than that of a point E, a γ phase composition (a point H) at cementite/austenite boundaries transfers along a solid solubility line of the cementite, toward a point I on a solid solubility line of cementite having the same activity as that of a point E. This results in that the remaining cementite in a content 5% by volume forms a solid solution with diffusion of Cr and a solid soluble concentration of carbon with martensite increases.

(3) A case 2 in which the solid solution formation of cementite drastically delays.

A solid soluble concentration of carbon in martensite is determined according to a carbon diffusion rate controlled step of cementite, described above the case (2). A mechanism, in which remaining cementite forms a solid solution by diffusion of an alloy element after a solid solution formation of cementite according to the case (2), assumes that the point H is in a region in which $Cr_7C_3$ carbide different from cementite is in equilibrium to a γ phase and the unequilibrated cementite is equilibrium to the γ phase, and a two phase equilibrium in which the unequilibrated cementite is equilibrium with the γ phase is formed during a solid solution formation of the cementite. The assumption is based on the view that in the process in which cementite forms a solid solution, a reaction which requires free energy is not generated via a complex diffusion process such that $Cr_7C_3$ carbide is newly formed before cementite disappears. In such a case, a solid solution formation proceeds according to the alloy element diffusion controlled rate step of cementite which does not require a newly formation of $Cr_7C_3$ carbide. Because of a restriction in which a composition of γ phase at boundaries of cementite/γ phase is transferred to a composition of a point K in a (γ phase+cementite+$Cr_7C_3$) three phase coexistence region where $Cr_7C_3$ carbide may not be precipitated, a solid solution formation of cementite more delays.

According to the solid solution formation mechanism (3), a limit point at which a significant delay in a solid solution formation of cementite occurs is a case in which Cr is concentrated in cementite so as to have a concentration of about 3.5 wt % or more under a heating temperature of 1000° C. When a heating temperature is 900° C., Cr is concentrated in cementite to have a concentration of about 2.5 wt %. For example, when a steel containing carbon of 0.4 wt % and Cr of 0.3 wt % is heated at 700° C., a concentration of Cr [Cr(wt %)] in the cementite is 3.2 wt %, obtained by using the following equation.

[Cr(wt %)]=α$K$Cr×a concentration of Cr in a steel/
(1−(a concentration of carbon in a steel/6.67)×
(1−α$K$Cr)).

This equation shows that the lower limit of the addition amount of Cr is about 0.3 wt %, and more preferably about 0.5 wt % or more.

In order to disperse cementite stably without forming a solid solution, it is necessary that a concentration of Cr in cementite is 3.5 to 12 wt %, preferably 4 to 10 wt %. And, an amount of Cr to be added to a steel containing carbon of 1.5 wt % is about 3 wt %. More preferably, the upper limit of an amount thereof is 2 wt % from an economical viewpoint. Referring to FIG. 5, when a steel which contains cementite containing at least Cr of 3.5 to 12 wt % is rapidly induction heated at a rolling surface thereof up to two or more austenitizing temperatures within a range of 750 to 1150° C. and then quenched, a quench hardened layer having a parent phase comprising of two or more martensite phases in the depth direction from a surface layer to a deeper portion thereof can be formed. And, between the quench hardened layers, a transitive intermediate layer is formed.

Figure 6:
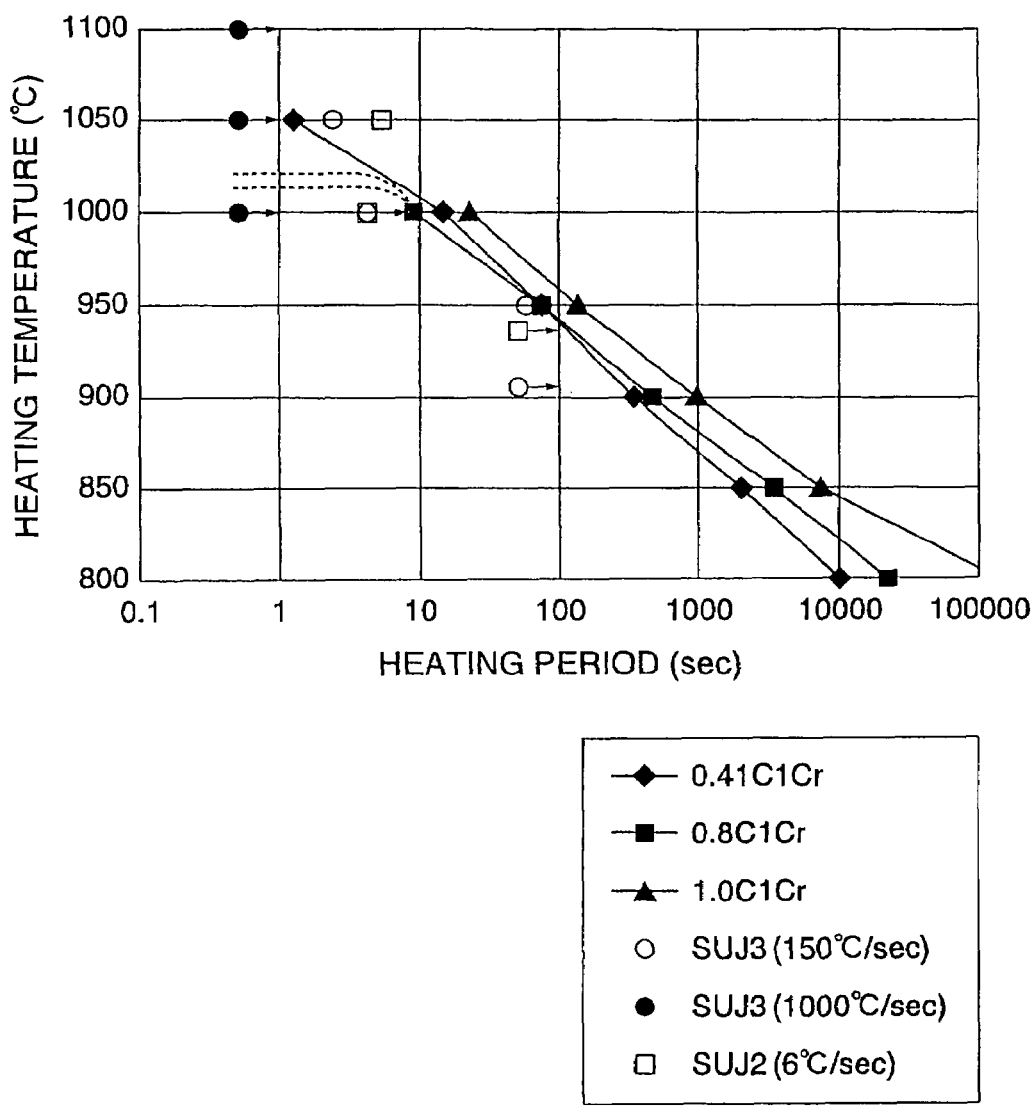
FIG. 6 is a graph showing a relation between the heating period and the heating temperature of the steels in the cases of a solid solution formation mechanism of cementite according to the case (2).
Figure 7:
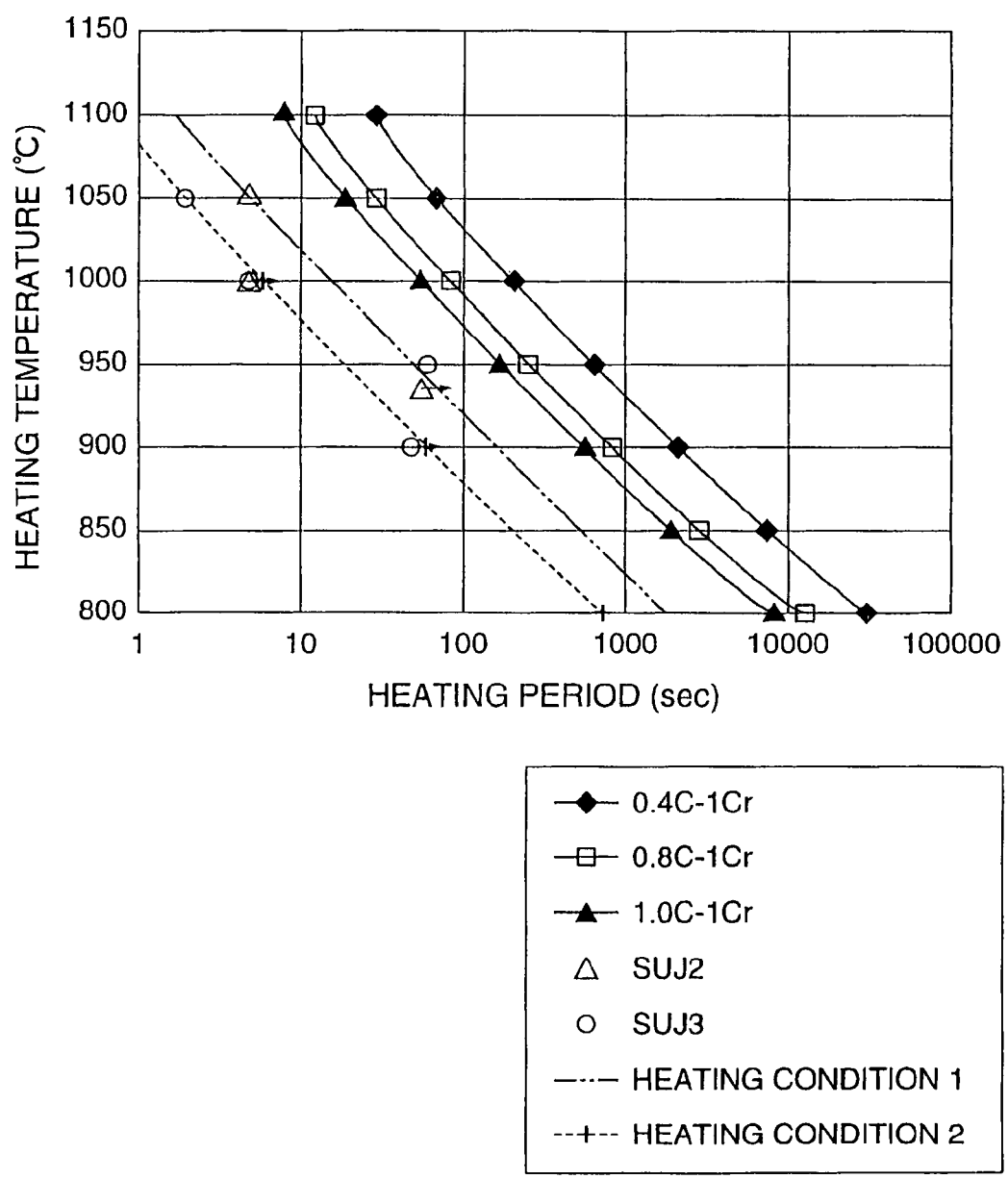
FIG. 7 is a graph showing a relation between the heating period and the heating temperature of the steels in the cases of a solid solution formation mechanism of cementite according to the case (3).

Steels containing Cr of 1 wt % and carbon of 0.4 wt %, 0.8 wt % and 1.0 wt %, respectively, are sufficiently heated at 700° C. so as to adjust a concentration of Cr contained in cementite in each steel to be 11 wt % and 7.5 wt %. And, in each case in which the steels are heated at various quenching temperatures, heating periods in which cementite having a grain size of 0.4 μm forms a solid solution completely according to the aforesaid case (2) and the aforesaid case (3) are obtained by calculation. On the other hand, SUJ2 steel and SUJ3 steel are also heated up to various quenching temperatures at a various heating rate (SUJ2 steel; 6° C./sec, SUJ3 steel; 150° C./sec and SUJ3 steel; 1000° C./sec), and then heating periods are obtained. FIG. 6 and FIG. 7 are graphs showing a relation between the heating period and the heating temperature of the steels in the cases of a solid solution formation mechanism of cementite according to the case (2) and the case (3), respectively. Arrows in this figure shows that a large amount of cementite remains and a longer heating period is necessary in order to form a solid solution of the cementite.

As compared FIG. 6 with FIG. 7, a rate in which cementite forms a solid solution according to a mechanism of FIG. 6 is slightly faster than that of FIG. 7, and is well agreed with an experimental result at a heating rate of 150° C. or less. From a result of FIG. 6, when a concentration of Cr in cementite is not about 10 wt % or more, heating at 1050° C. causes cementite to form a solid solution rapidly. On the contrary, in SUJ3 which is heated to 1100° C. for one second, cementite remains remarkably. This is well agreed with a calculated result of FIG. 7. Thus, a rapidly heating condition in which a heating rate is at least 150° C./sec adopts a solid solution forming mechanism of FIG. 7 (the case (3)). In such an induction quenching method on the premise of the rapidly heating, cementite easily remains From the result, for a suitable heating condition (a heating period and a heating temperature) to adjust a concentration of carbon which forms a solid solution with martensite and also make cementite to remain in martensite, rapidly heating up to a temperature within a range of 850 to 1100° C. within a heating period of $t(sec)=1400/(T(° C.)+273))^{28}$ or less, represented by a solid line of FIG. 7, shall be applied. The upper heating period thereof is too long compared with the heating period in which carbon diffuses in austenite according to a carbon diffusion rate controlled step. So, quenching for a heating period under $t(sec)=1360/(T(° C.)+273))^{28}$, represented by a broken line of FIG. 7, also permits an adjustment of a concentration of carbon which forms a solid solution with cementite and an amount of remaining cementite.

From FIG. 7, in order to form the first quench hardened layer, when heat is inputted along the teeth profile of a gear, a heating period for rapidly heating a surface layer thereof up to an austenitizing temperature within a range of Ac1 temperature or Ac3 temperature to 900 or 1100° C. is preferably within 2 seconds. And, in order to form a second quench hardened layer through a deeper portion under the first quench hardened layer, a heating period for heating up to a range of Ac1 temperature or Ac3 temperature to 950° C. is preferably 2 to 1000 seconds.

When rapidly heating at a heating rate of 150° C./sec or more is carried out, since it is necessary that ferrite before quenching is rapidly austenitized by massive reverse transformation (transformation from ferrite to austenite), it is preferable that a quenching temperature is set at A3 temperature (about 950° C.) or more. Accordingly, an austenitizing heating temperature for forming a first quench hardened layer is set at 900 to 1150° C.

In an actual heat treatment process, a heating period is regulated such that a distance, in which alloy elements are diffused during a total period of a temperature raising period from Ac1 temperature or Ac3 temperature to a quenching temperature and a holding time until cooling is started, is within a distance, in which alloy elements are diffused during a period of $t(sec)=(1400/(T(° C.)+273))^{28}$ or $t(sec)=(1360/(T(° C.)+273))^{28}$ However, the heating period can be simplified as described above.

From results of FIG. 6 and FIG. 7 and a heterogeneous diffusion period (a case in which cementite having a radius of 0.2 μm forms a solid solution) of FIG. 3, in a case of a long heating period, for example, 950° C.; 10 seconds, 850° C.; 100 seconds and 750° C.; 100 seconds, a sufficient amount of cementite remains and heterogeneous state is maintained. In terms of a result of FIG. 5, when a SUJ2 steel, in which a concentration of Cr in cementite therein is prepared to be 8.5 wt %, is heated at 850° C. for 100 seconds through a deeper portion under a surface layer thereof and then heated the surface layer to 1100° C. for 1 second and quenched, or when the steel is heated at the surface layer to 1100° C. and then heated at 800° C. while being cooled and quenched, a induction quenched member can be produced. Such produced member has a first quench hardened layer, in which martensite having a carbon concentration of about 0.55 wt % contains cementite dispersed therein in a content of 7% by volume, and a second quench hardened layer, in which at least either one of martensite phase or bainite phase having a carbon concentration of about 0.2 wt % contains cementite dispersed therein in a content of 12% by volume, formed at a deeper portion under the first quench hardened layer, and further a deeper unquenched portion under the second hardened layer.

A rolling member, which is formed in such a manner that a surface portion thereof is heated at a higher austenitizing temperature and a deeper portion thereof is heated a lower austenitizing temperature, includes a gear with an axis portion, a bearing, a cam and a camshaft as well as a gear. This provides bearing stress, spalling resistance, torsional stress and bending stress thereto. Here, the austenitizing temperatures may be two or more temperatures.

It is preferable that a carbon concentration in a martensite phase of the second quench hardened layer is 0.1 to 0.3 wt % in view of a carbonized gear, more preferably 0.1 to 0.25 wt %. And, from a productive viewpoint, it is preferable that an austenitizing temperature for forming the second quench hardened layer is within a range of 800 to 900° C. and a concentration of Cr in cementite is 6 to 12 w %.

Cr, Mn, Mo, V, W, Ni, Si and Al, sometimes contained in a steel for machinery, are elements for increasing hardenability. Mn, Mo, V and W as well as Cr are concentrated in cementite, while Ni, Si and Al are discharged from cementite. A distribution coefficient $\alpha KM$ of an element M between cementite and ferrite at 700° C. is shown by an alloy element M (wt %) in cementite/an alloy element M (wt %) in ferrite. The distribution coefficient of each element is the following; $\alpha KCr$:28, $\alpha KMn$:10.5, $\alpha KV$:9, $\alpha KMo$:7.5, $\alpha KW$:2, $\alpha KNi$:0.34, $\alpha KCo$:0.23, $\alpha KSi$:0 and $\alpha KAl$:0. The distribution coefficient $\gamma KM$ of each element at 850° C. is the following; $\gamma KCr$:7, $\gamma KMn$:2.1, $\gamma KV$:12, $\gamma KMo$:3.8, $\gamma KCo$:0.42, $\gamma KNi$:0.2, $\gamma KSi$:0 and $\gamma \alpha KAl$:0. So, when a concentration of Cr in cementite is adjusted in at least either one of a cementite+ferrite two phase region or a cementite+austenite two phase region, Mn, Mo, V and W which coexist therewith are concentrated in cementite, whereby hardenability for quenching cementite without forming a solid solution decreases remarkably. In addition, by dispersing cementite without forming a solid solution by adding Cr, a concentration of carbon which forms a solid solution with austenite and a concentration of each alloy element are adjusted to be lower and make austenite crystal grain to be a fine-grain, and therefore decrease hardenability lower than a carbon steel.

Next, the purpose of the addition of each element will be explained in the every element.

(Cr)

Cr is concentrated in cementite in a ferrite+cementite two phase region remarkably and also in an austenite+cementite two phase region. And, Cr can form a solid solution with cementite in a large amount as about 35 wt %. And, Cr has high affinity with carbon in austenite, as described above, so as to delay a solid solution formation of cementite with austenite phase. In order to disperse cementite in a martensite phase, which forms a solid solution with carbon of 0.35 to 0.8 wt %, in a content of at least 2% by volume, it is preferable that Cr of 0.3 to 2 wt % is added to a steel containing carbon of 0.4 to 1.5 wt % so as to adjust a concentration of Cr in the cementite to be 3.5 to 12 wt %. In order to form the second quench hardened layer by the preheating, it is preferable to adjust a concentration of Cr in the cementite to be 4 to 12 wt %.

(Mn)

Mn works to form sulphide and form a solid solution with austenite phase so as to increase hardenability. And, Mn is concentrated in cementite more densely than V and Mo in a ferrite+cementite two phase region. However, in an amount range of Mn added to a conventional steel, Mn does not form austenitized special carbide and has behavior to decrease carbon activity in austenite less than about half of the behavior of Cr. So, if Mn of about 8 wt % forms a solid solution with cementite, it affects less on delay in a solid solution formation of cementite like Cr. However, when Mn coexists with Cr, Mn promotes an action in which Cr delays a solid solution formation of cementite and significantly contributes to a formation of retained austenite by the aforesaid mechanism and to hardenability, whereby it is preferable that Mn is added within an amount range (0.1 to 2 wt %) added to a conventional steel.

And, when teeth of a gear (especially, a ring gear) having module of 4 or less is entirely heated by induction heating, it is through-hardened by rapidly cooling (quenching treatment) after heating, causing quenching crack. And, remarkable tensile residual stress is produced at the quench hardened layer, causing deteriorating strength of the gear. Accordingly, in order to prevent the through-hardening, it is necessary to use an unavailable steel prepared to have a low amount of Mn which is contained in a conventional induction hardening carbon steel and a low carbon steel. In the present invention, a second quench hardened layer which has a parent phase taking the form of martensite with a low carbon concentration is formed at a deeper portion of the teeth, whereby the through-hardening can be prevented. And, Mn is made to be concentrated in cementite so that the DI value can be decreased. Accordingly, the upper limit of an amount of Mn to be added to a steel can be increased to 2.0 wt % and therefore an available steel can be used. And, Mn stabilizes austenite phase remarkably. So, when alloy elements such as Si and Al, stabilizing ferrite phase, is added, it is preferable to add Mo of 1 wt % or more. In addition, Mn moves Al temperature to lower thereby to decrease the lower limit of a heating temperature for forming the second quench hardened layer in the present invention, whereby it is preferable that Mn is positively added.

(Mo, W)

Mo is concentrated in cementite, as well as Cr, and increases hardenability and also toughness of a steel whereby it is used in the present invention. Especially, when a small amount (0.005 wt %) of Mo is added thereto, pearlite transformation delays remarkably so as to form a martensite structure or a binatite structure easily, resulting in preventing pearlite from being precipitated at a core portion of the teeth of the gear. And, a maximum amount of Mn which forms a solid solution with cementite is 2 wt %. So, when Mn is added in an amount of 2 wt % or more, Mn is precipitated as special carbide such as $Fe_3Mo_3C$. For example, in steels containing carbon of 0.55 wt % and 1.5 wt %, adding Mo of 0.4 wt % and 0.7 wt %, respectively, cause precipitating $Fe_3Mo_3C$. Accordingly, it is preferable that the upper limit of an amount of Mo to be added is set at 0.7 wt %. More preferably, from an economical viewpoint, the upper limit thereof is set at 0.4 wt %, because when Mn is added in an amount of 4 wt % or more, Mn works to delay a solid solution formation of cementite, as with Cr in the above case (3).

W works as well Mo, therefore, in the present invention, the upper limit of an addition amount of Mo+W is set at 0.7 wt %, which is equal to the upper limit of addition amount of Mo as described above, because of difference between the specific gravities thereof and an economical efficiency. (Since a specific gravity of Mo is about ½ times that of W, the upper limit of addition amount of Mo is about 1.4 wt % in terms of W. In this case, when an amount of W is extremely smaller than W, an addition amount of Mo becomes too large.)

(V)

V is concentrated in cementite remarkably, however, its maximum solid solubility limit with cementite is small as 0.6 wt %. So, in steels containing carbon of 0.55 wt % and 1.5 wt %, adding V of 0.12 wt % and 0.2 wt %, respectively, cause precipitating of $V_4C_3$-type carbide. And, V hardly forms a solid solution with martensite by an induction quenching treatment and delays a solid solution forming rate of cementite. And, V hardly influences for hardenability, however, in order to increase abrasion resistance and seizing resistance of a rolling surface of a gear, it is preferable to precipitate $V_4C_3$-type carbide. Accordingly, in terms of an amount of V added to a work steel, the upper limit of addition amount of V is set at 2 wt %, more preferably an amount of V to be added is set at 0.2 to 1.0 wt % from a machining viewpoint.

And, a precipitation of $V_4C_3$-type carbide causes a fine grain formation of old austenite crystal grain, therefore improves toughness and decreases hardenability. Accordingly, V is preferably added positively.

When a carbon steel for induction hardening is induction heated, even in a case of heating at 875° C. for a few seconds, old austenite crystal grain coarse to have ASTM7. Accordingly, in the present invention, it is preferable that V in an amount of 0.1 to 2 wt % is added so as to form a fine grain structure having ASTM9 or more, more preferably ASTM10 or more. This enables to improve abrasion resistance, seizing resistance and bearing stress and suppress hardenability and therefore to produce a small module gear by an induction quenching method for quenching all teeth at once.

(Nb, Ti, Zr and the like)

In order to promote crystal grain to be finer grain size by induction quenching, it is preferable to add one or more elements of Nb, Ti and Zr in an amount of 0.01 to 0.5 wt %.

(B)

Adding B in an amount of 0.0003 to 0.01 wt % delays pearlite transformation remarkably, therefore increasing hardenability. And, B is a preferable element for forming the second quench hardened layer which is formed at a deeper portion under the surface layer and has a parent phase taking the form of martensite phase with a low carbon concentration. In addition, B as with Mo prevents precipitating of pearlite and works to form a high ductile bainite structure when coexists with a small amount of Mo. Accordingly, in the present invention, it is preferable to add B to a steel to be induction hardened.

(Si, Al, Ni and Co)

Si, Al, Ni and Co are discharged from cementite and concentrated in martensite, however, they increase an activity of carbon, contrary to Cr. Especially, Si increases activity of carbon in austenite remarkably and has a behavior to decreases a concentration of carbon which forms a solid solution with the martensite phase (for example, ΔC=0.1 wt %C/1 wt %Si). Therefore, Si hardly increases hardenability.

Si and Al increase tempering-softening resistance at lower temperatures within a range of 100 to 400° C., whereby it is preferable that they are positively added to a rolling member such as various gears and bearings, an abrasion resistant member and an abrasion resistant sliding member. Accordingly, it is preferable that Si and Al are added in each amount of 0.05 to 2 wt %. However, a large addition amount thereof causes ferrite to be stabilized remarkably, as a result, an austenitizing temperature within a range of Ac3 temperature to 950° C. for forming a second quench hardened layer moves to higher and ferrite phase becomes to be mixed easily. Accordingly, in the present invention, the upper limit of an amount of Si+Al is set at 2.0 wt %. In an induction quenched gear in which Mn, Cr, Mo and V are concentrated in cementite, according to the present invention, Cr, Mo and V hardly influence for improvement in tempering-softening resistance of martensite in a rolling surface thereof. Accordingly, it is preferable to add Si+Al in an amount of 0.5 wt % or more. And, since Al has a ferrite stabilizing behavior larger than Si, the upper limit of an amount of Al is set at 1.0 wt %. In such a case, it is preferable to further add Ni, Mn and Cu so as to coexist therewith.

Ni increases hardenability and also toughness. In an induction quenched gear in which Mn, Cr, Mo and V are concentrated in cementite according to the present invention, as the gear size becomes larger, hardenability is necessarily increased in order to form a second quench hardened layer through a deeper portion. Accordingly, it is preferable that Ni is positively added and the upper limit an amount thereof is set at 3 wt %, because retained austenite is formed excessively by an induction quenching treatment and because of an economical efficiency. Coexisting Al and Si with Ni increases tempering-softening resistance and improves toughness remarkably.

Co decreases hardenability, and increases distribution coefficients αKM of alloy elements such as Cr, Mn and Mo. In addition, Co improves tempering-softening resistance of martensite, however, it is very expensive. Accordingly, in the present invention, it is preferable to add Co in an amount of 3 wt % or less.

Cu stabilizes austenite and increases atmospheric corrosion resistance. Accordingly, in terms of an ease of red shortness during forging of a raw material, it is preferable to add Cu in an amount of 1 wt % or less.

N, P, S and O are contained in a conventional amount range of 0.05 wt % or less as an impurity element. When an alloy element such as Ti, Nb, Zr, V and Al is added, nitride of such element mainly is dispersed. Accordingly, an amount of N is set at 0.3 wt % or less. And, when S is added to form a free cutting steel, it is preferable that an amount of S is set at 0.5 wt % or less.

Figure 8A:
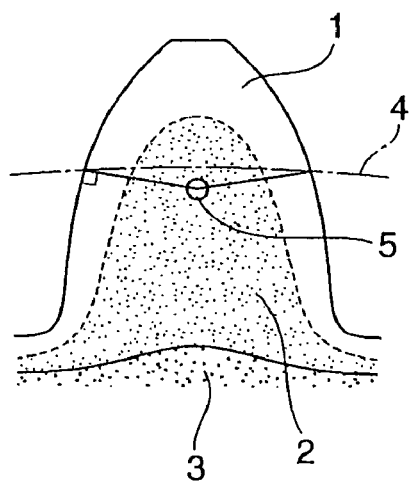
Figure 8A:
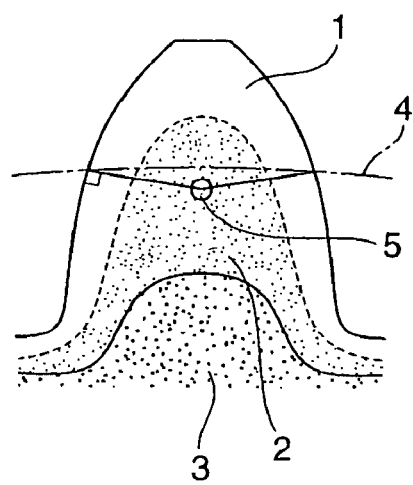
Figure 8C:
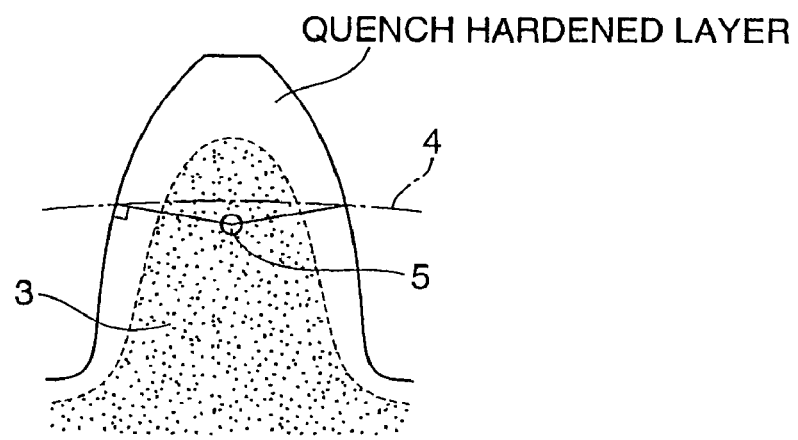
FIG. 8C is a drawing schematically showing a structure of an induction hardened gear according to a conventional hardening method (quenching along the teeth profile).

Referring to FIG. 8 schematically showing a structure of teeth after quenching, a first embodiment of the present invention will be explained. FIGS. 8A and 8B are drawings schematically showing structures of induction hardened gears according to the present invention, FIG. 8C is a drawing schematically showing a structure of an induction hardened gear according to a conventional hardening method (quenching along the teeth profile).

A gear according to the present invention is made such that a steel, which is prepared to have cementite containing Cr of 3.5 to 12 wt %, is used so as to form a first quench hardened layer 1 in which a parent phase thereof takes the form of martensite phase hardened to have Vickers hardness of Hv600 or more and does not contain cementite remaining therein and a second quench hardened layer 2 hardened to have Vickers hardness of Hv300 to 500. The second quench hardened layer 2 has a parent phase taking the form of at least either one of martensite phase or bainite phase and contains unquenched cementite remaining therein. And, at a deeper portion under the second quench hardened layer 2, a two ferrite+cementite phase structure remains as an unquenched portion 3.

Hardenability (DI value (in)) of the second quench hardened layer 2 of the gear having a module (m) is obtained by using concentrations of carbon and alloy elements in the martensite phase and a grain size of old austenite crystal. By adjusting the hardenability (DI) so as to satisfy the following equation, $$DI \geq 0.12 \times m + 0.2,$$

a second quench hardened layer 2 of which a parent phase contains at least either one of martensite phase or bainite phase can be formed at a center internal position 5 of the teeth on the circular pitch (the center internal position 5 means a point in which perpendicular lines dropped from both the pitch points with respect to both tooth flanks toward the inside of the tooth are crossed inside the tooth).

It is preferable that the first quench hardened layer 1 has martensite phase which forms a solid solution with carbon of 0.4 to 0.8 wt %. And, the second quench hardened layer 2 has at least either one of a martensite phase or a bainite phase which forms a solid solution with carbon of 0.07 to 0.5 wt %, more preferably 0.07 to 0.3 wt %, and contains granulated cementite having an average grain size of 1 μm or less without forming a solid solution. In addition, it is preferable to be tempered at 100 to 350° C. adequately.

Figure 9:
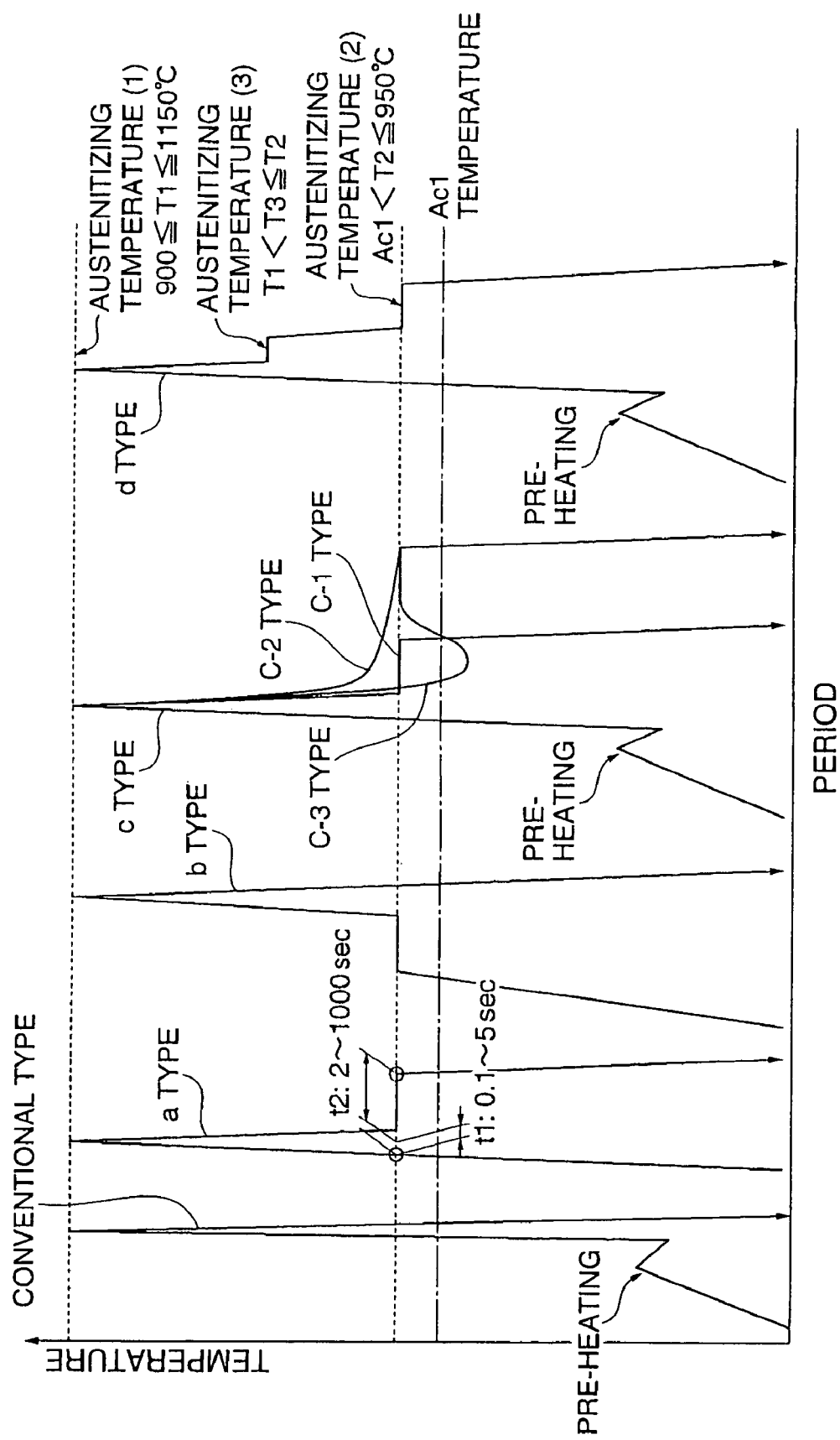
FIG. 9 is a drawing showing representative induction quenching patterns according to the first embodiment.

In a producing method of a gear according to the embodiment of the present invention, a steel (hardness of Hv160 to 260), in which Cr is concentrated in cementite in a ferrite+ cementite two phase region by a cementite granulating treatment or a quenching and tempering treatment, is machined to have a shape of a gear and then the gear is heat treated according to typical heat treatment patterns shown in FIG. 9 and the like. The (a) type in FIG. 9 is a process such that a surface layer thereof is heated along the teeth profile up to an austenitizing temperature (1) so as to form a first quench hardened layer 1 on the surface layer, and then heated while being cooled through a deeper portion under the first quench hardened layer 1 to an austenitizing temperature (2) so as to form a second quench hardened layer 2, and then quenched. The (b) type in FIG. 9 is a process, contrary to the (a) type, such that a deeper portion under a surface layer is heated at an austenitizing temperature (2) so as to form a second quench hardened layer 2, and then heated the surface layer along the teeth profile at an austenitizing temperature (1) so as to form a first quench hardened layer 1, and then quenched. And, the (c) type is the (a) type process to which a pre-heating treatment is added. Such pre-heat treatment is preferable for increasing heat inputting performance along the teeth profile. In such a case, a pre-heating temperature is preferably Ac1 temperature or less. The (c-3) type is a process such that after heating to austenitizing temperature (1) and cooling, the gear is heated to austenitizing temperature (2) and quenched by a process different from the former heating process. Such (c-3) type also can achieve a heat treatment according to the present invention. Accordingly, a heating process for heating to austenitizing temperature (2) includes a salt bath as well as the induction heating process.

In the (a) type process, it is preferable that a cooling rate from an austenitizing temperature (1) down to an austenitizing temperature (2) is regulated. And, a (d) type process in which three of more types of quench hardened layer are formed so as to change the hardness in the depth direction from the first quench hardened layer to second quench hardened layer smoothly is also preferable. These enable to form a quench hardened layer having substantially the same hardening pattern as that of a carburized gear.

It is preferable that an austenitizing temperature (1) is within a range of 900 to 1150° C. and an austenitizing temperature (2) is within a range of Ac1 temperature or Ac3 temperature to 950° C., as described above. In the present invention, an austenitizing temperature (1) is set such that almost all of the cementite in the unquenched portion forms a solid solution with austenite (an amount of retained cementite: under 2% by volume).

And, for a heat inputting method along the teeth profile, a double induction quenching method or an induction quenching method for applying a larger power instantaneously is possible.

In the present invention, it is preferable to disperse special carbide such as $V_4C_3$ and TiC in order to improve abrasion resistance and seizing resistance of the first quench hardened layer.

In addition, in the present invention, it is preferable to contain carbon of 0.4 to 0.8 wt %, Mn of 0.1 to 2 wt %, Cr of 0.3 to 2 wt %, and further one or more elements of Si+Al of 0.05 to 1.5 wt %, Al of 0.01 to 1 wt %, Ni of 3.0 wt % or less, B of 0.01 wt % or less, V of 2 wt % or less, Mo+W of 0.7 wt % and Ti+Nb+Zr of 0.2 wt % in order to prevent cementite from remaining in the first quench hardened layer.

In a gear according to the present invention, it is preferable that the first quench hardened layer 1 (Hv513 or more) is formed so as to have thickness of (0.2 to 0.6)×m(module) at the circular pitch 4 and thickness of (0.15 to 0.6)×m(module) at the dedendum with a surface layer having hardness Hv600 or more at the circular pitch and the dedendum, and the second quench hardened layer 2 has hardness of Hv300 to 500. And, it is preferable that the center internal position 5 is positioned in the second quench hardened layer 2.

In order to improve bending fatigue strength of the dedendum, bearing stress and torsional strength of the axis portion, it is preferable that the surface layer of the first quench hardened layer 1 is treated by a shot peening treatment so as to provide compressive retained stress of large as 50 kgf/cm² or more thereto.

Next, the second embodiment of the present invention will be explained.

In a gear according to the second embodiment of the present invention, cementite remains dispersing in the first quench hardened layer 1 in a content of 2 to 17% by volume, without dispersing in the unquenched portion 3 according to the first embodiment, for the purpose of improving pitting strength and abrasion resistance of the gear. In addition, cementite remains dispersing in also the second quench hardened layer, which is formed at a deeper portion under the first quench layer 1, in a content of 3 to 20% by volume. In the gear according to the present invention, it is preferable to be tempered at 100 to 350° C. such that the first quench hardened layer 1 (Hv513 or more) is formed so as to have thickness of (0.2 to 0.6)×m(module) at the circular pitch 4 and thickness of (0.15 to 0.6)×m(module) at the dedendum with a surface layer having hardness Hv600 or more at the circular pitch and the dedendum, and the second quench hardened layer 2 has hardness of Hv300 to 500. And, it is preferable that the center internal position 5 is positioned in the second quench hardened layer 2.

It is preferable that a steel to be used contains carbon of 0.55 to 1.5 wt %, Mn of 0.1 to 2 wt %, Cr of 0.3 to 2 wt %, and further one or more elements of Si+Al of 0.05 to 1.5 wt %, Al of 0.01 to 1 wt %, Ni of 3.0 wt % or less, B of 0.01 wt % or less, V of 2 wt % or less, Mo+W of 0.7 wt % or less and Ti+Nb+Zr of 0.2 wt % or less.

And, it is preferable that the first quench hardened layer 1 contains retained austenite in a content of 10 to 50% by volume in order to provide toughness and improve abrasion resistance, seizing resistance and bearing stress. If an amount of the retained austenite exceeds 50% by volume, the quench hardened layer becomes brittleness, causing deteriorating abrasion resistance and bearing stress.

And, it is preferable that by adjusting hardenability (DI value (in)) of the second quench hardened layer 2, in which the DI value is obtained by using a concentration of carbon which forms a solid solution with martensite phase, concentrations of alloy elements and a grain size of old austenite crystal, so as to satisfy the following equation, $$DI \geq 0.12 \times m + 0.2,$$

the center internal position 5 is formed in a second quench hardened layer 2 of which a parent phase takes the form of at least either one of martensite phase or bainite phase.

A gear according to this embodiment is produced by an induction hardening treatment having the same heat treatment pattern as the first embodiment, except that cementite remains in a content of 2% by volume at a state for heating up to an austenitizing temperature (1). And, it is also preferable, as with the first embodiment, that special carbide such as $V_4C_3$ and TiC in a suitable amount is dispersed.

Figure 10A:
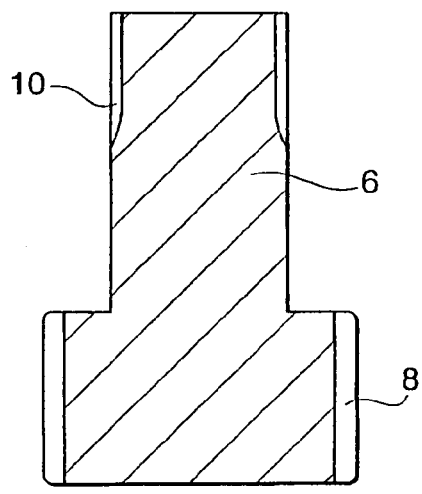
FIG. 10A and FIG. 10B are drawing each showing a structure of a gear with an axis portion.
Figure 10B:
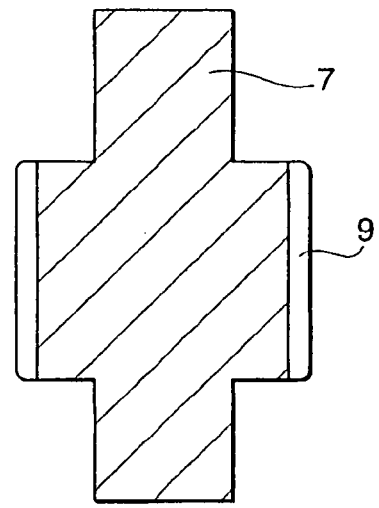

In gears (pinion gears) as shown in FIGS. 10A and 10B, which have axial portions 6 and 7, respectively, it is necessary to have sufficient strength against torsional, stress and bending stress applied at torque transmission. Consequently, forming the axis portions 6 and 7 by the induction hardening method according to the first and second embodiments enables to form a deeper quench hardened reinforced layer. The induction hardening methods according to the first and second embodiments are suitable for forming a gear with an axis portion. In FIG. 10, the teeth 8 and 9, and a spline 10 are also shown.

In order to improve bending fatigue strength of the dedendum and bearing stress and torsional strength of the axis portion, it is preferable that the surface layer of the first quench hardened layer 1 is treated by a shot peening treatment so as to provide compressive retained stress of large as 50 kgf/mm² thereto.

Next, the third embodiment of the present invention will be explained.

Figure 11A:
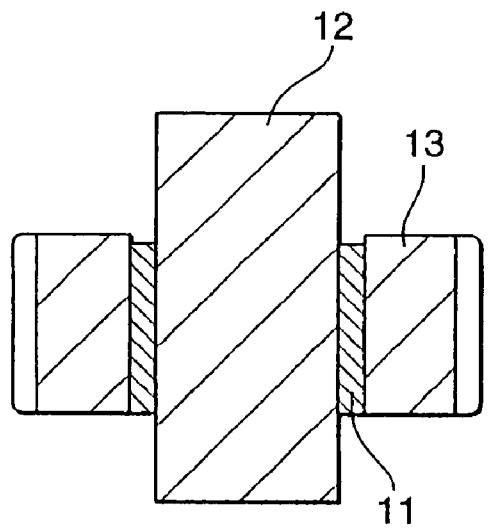
FIG. 11A and FIG. 11B are drawings each showing a structure of a rolling member other than a gear.
Figure 11B:
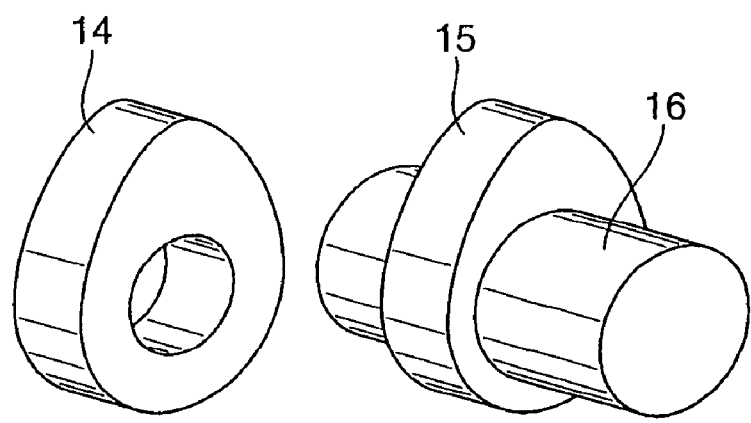

In this embodiment, a bearing 11, an axis member 12 such as a carrier pin and a gear 13 shown in FIG. 11A, and cams 14 and 15 and a cam shaft 16 shown in FIG. 11B are produced by gear producing techniques according to the first and second embodiments.

An induction hardened member such as a gear, a bearing case and a shaft, which requires high tempering-softening resistance, preferably contains one or more elements of Si and Al in an amount of 0.5 to 1.5 wt %. And, a member used accompanied with sliding preferably contains one or more elements of V and Ti in an amount of 0.1 to 2.0 wt % and special carbide of V and Ti mainly dispersed therein in a small amount.

In this embodiment, it is preferable that the quench hardened layer has a martensite phase, which forms a solid solution with carbon of an adjusted amount of 0.35 to 0.8 wt % for any purpose and contains cementite dispersed therein in a content of 2 to 20% by volume. And, for the purpose of improvement in abrasion resistance, seizing resistance and bearing stress of an induction hardened member, it is preferable to form retained austenite in 10 to 50% by volume. If a content of retained austenite exceeds 50% by volume, the quench hardened layer becomes brittle, causing deteriorating abrasion resistance and surface pressure resistance.

In a case of a cam which requires heat crack resistance at sliding, it is preferable that quench hardened layer of a sliding surface has martensite phase which forms a solid solution with carbon of 0.35 to 0.55 wt % and contains cementite dispersed therein in 5 to 20% by volume. And, in order to improve abrasion resistance and seizing resistance, it is preferable to add V of 0.1 to 2.0 wt % so as to disperse $V_4C_3$-type carbide previously.

In order to improve surface pressure strength, abrasion resistance and seizing resistance, it is preferable that a quench hardened layer has martensite phase which forms a solid solution with carbon of 0.4 to 0.8 wt % and contains cementite and special carbide such as $V_4C_3$-type carbide dispersed therein in 5 to 20% by volume and in less than 5% by volume, respectively. If special carbide is dispersed in a content of 5% or more by volume, scraping characteristic to the counter surface becomes remarkable.

EXAMPLE

Example 1

Pitting Strength (a Pre-Test))

In this example, for examining rolling fatigue strength of a gear used accompanied with sliding, various quenching tempered carbon steels and carburized case-hardened steels were examined in pitting strength by a roller pitting test using a specimen shown in FIG. 12. Table 1 shows chemical compositions of the quenching tempered carbon steels and the carburized case-hardened steels. Each steel was machined to have a small roller specimen 17 shown in FIG. 12A. Then, No. 1, 2 and 4 specimens were heated at 820° C. for 30 minutes and then water-quenched, and after being tempered at 160° C. for 3 hours, were prepared to the test. No. 3 and 4 specimens after thermal refining were heated at a rolling surface thereof by an induction power supply of 40 kHz and 200 kW at 950° C. and then quench hardened, and after being tempered at 160° C. for 3 hours, were prepared to the test. No. 5 specimen was carburized (carbon potential 0.8) at 930° C. for 5 hours and then cooled down to 850° C., and after being maintained at 850° C. for 30 minutes, was quenched by quenching oil of 60° C. Then, after being tempered at 160° C. for 3 hours, it was prepared to the test.

TABLE 1

| COMPOSITIONS OF STEELS (wt %) | | | | | | |
|---|---|---|---|---|---|---|
| | C | Si | Mn | Ni | Cr | Mo | COMMENT |
| No. 1 | 0.55 | 0.23 | 0.71 | | 0 | 0 | S55C |
| No. 2 | 0.77 | 0.21 | 0.74 | | 0 | 0 | EUTECTOID CARBON STEEL (1) |
| No. 3 | 0.85 | 0.22 | 0.81 | | 0.43 | 0 | EUTECTOID CARBON STEEL (2) |
| No. 4 | 0.98 | 0.27 | 0.48 | | 1.47 | | SUJ2 |
| No. 5 | 0.19 | 0.22 | 0.75 | 0 | 0.97 | 0.15 | SCM420H |

Figure 13A:
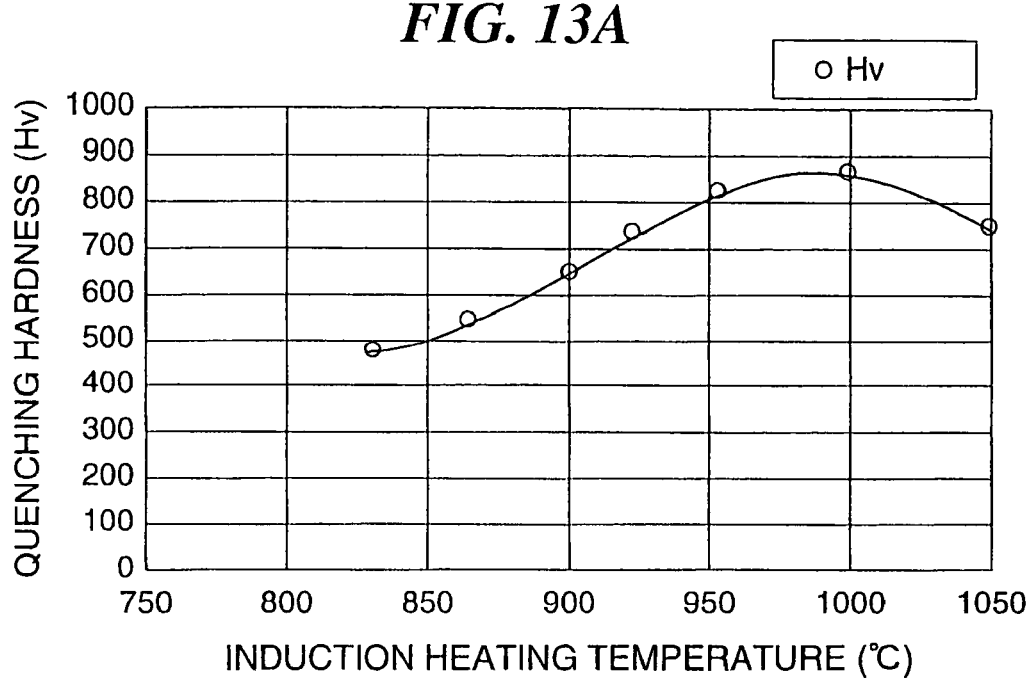
FIG. 13A is a graph showing a relation between the heating temperature and the hardness.
Figure 13B:
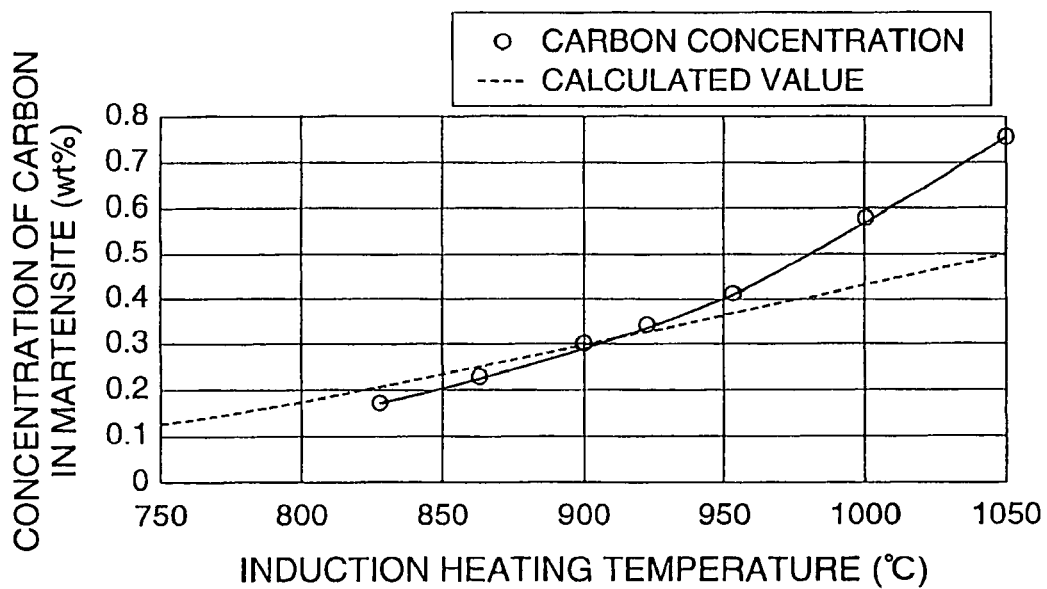
FIG. 13B is a graph showing a relation between the heating temperature and the carbon concentration (6° C./sec) in martensite
Figure 13C:
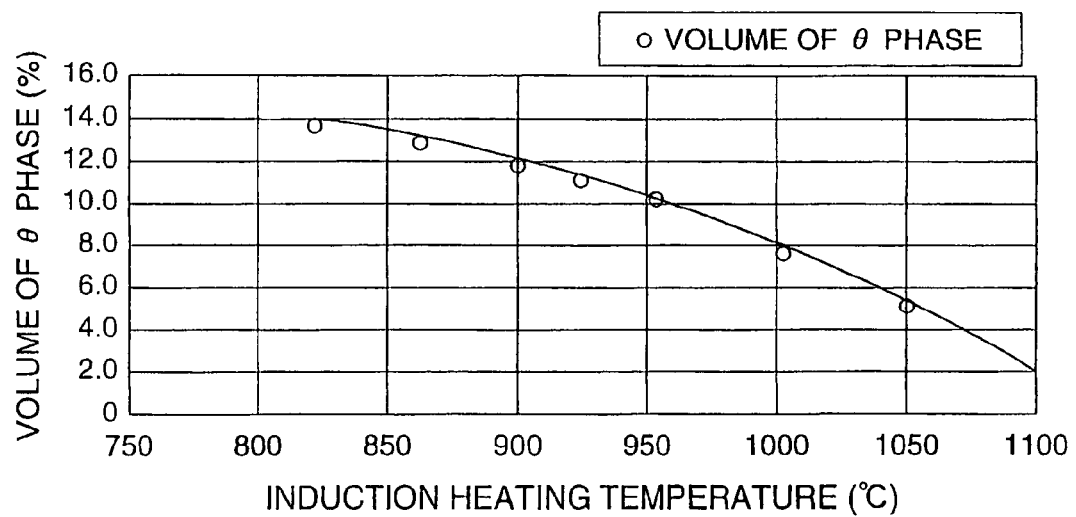
FIG. 13C is a graph showing a relation between the heating temperature and the volume of θ phase.

No. 4 spheroidized SUJ2 steel was induction heated to up 800° C. or more at a heating rate of 6° C./sec and after being maintained at a predetermined heating temperature for about 5 seconds, it was water quenched. And then, the quench hardened layer of the steel was examined in hardness, a carbon concentration in martensite and an amount of dispersed cementite which does not form a slid solution. The carbon concentration was obtained by analysis using X-ray analyzer. FIG. 13A is a graph showing a relation between the heating temperature and the hardness. FIG. 13B is a graph showing a relation between the heating temperature and the carbon concentration. FIG. 13C is a graph showing a relation between the heating temperature and the amount of dispersed cementite. The graphs show that concentrating (about 7.8 wt %) Cr in cementite delays a solid solution formation of cementite with austenite. In order to obtain martensite (which forms a solid solution with carbon of about 0.35 wt %) having substantially the same hardness as a carburized hardened layer, it is necessary to set a heating temperature at 900° C. or more. And, when a heating temperature increases to 1000° C., cementite remains in a content of 8% by volume without forming a solid solution. And, No. 3 and No. 4 steels were quenched at an induction quenching temperature of 950 to 980° C. and then tempered at 160° C. for 3 hours. As a result, the No. 3 steel contained cementite remaining therein in a content of 2% by volume, and the No. 4 steel contained cementite remaining therein in a content of 10%.

A large roller specimen 18 shown in FIG. 12B was made such that No. 4 SUJ2 steel was heated at 820° C. for 30 minutes, and after being water quenched, was tempered at 160° C. for 3 hours.

A roller pitting test was carried out using a test machine having two parallel rotation axes. The small roller specimen 17 and the large roller specimen 18 were set to the rotation axes so as to align the center axes 21 and 22 of the specimens 17 and 18 with the rotation axes of the test machine. And then, a test surface 19 of the small roller specimen 17 was contacted with a test surface 20 of the larger roller specimen 18 with applying a predetermined pressure, and then the rotation axes of the testing machine were rotated at a predetermined rotation rate such that the test surfaces 19 and 20 were rotated in the same direction. In this example, while the test surfaces being lubricated with #30 engine oil at 70° C., the small roller and the large roller (a load roller) were rotated at a rotation rate of 1050 rmp and 292 rpm, respectively, with applying a slipping rate of 40%. Then, a roller pitting test was carried out with changing a surface pressure in 375 to 220 kgf/mm².

Figure 14:
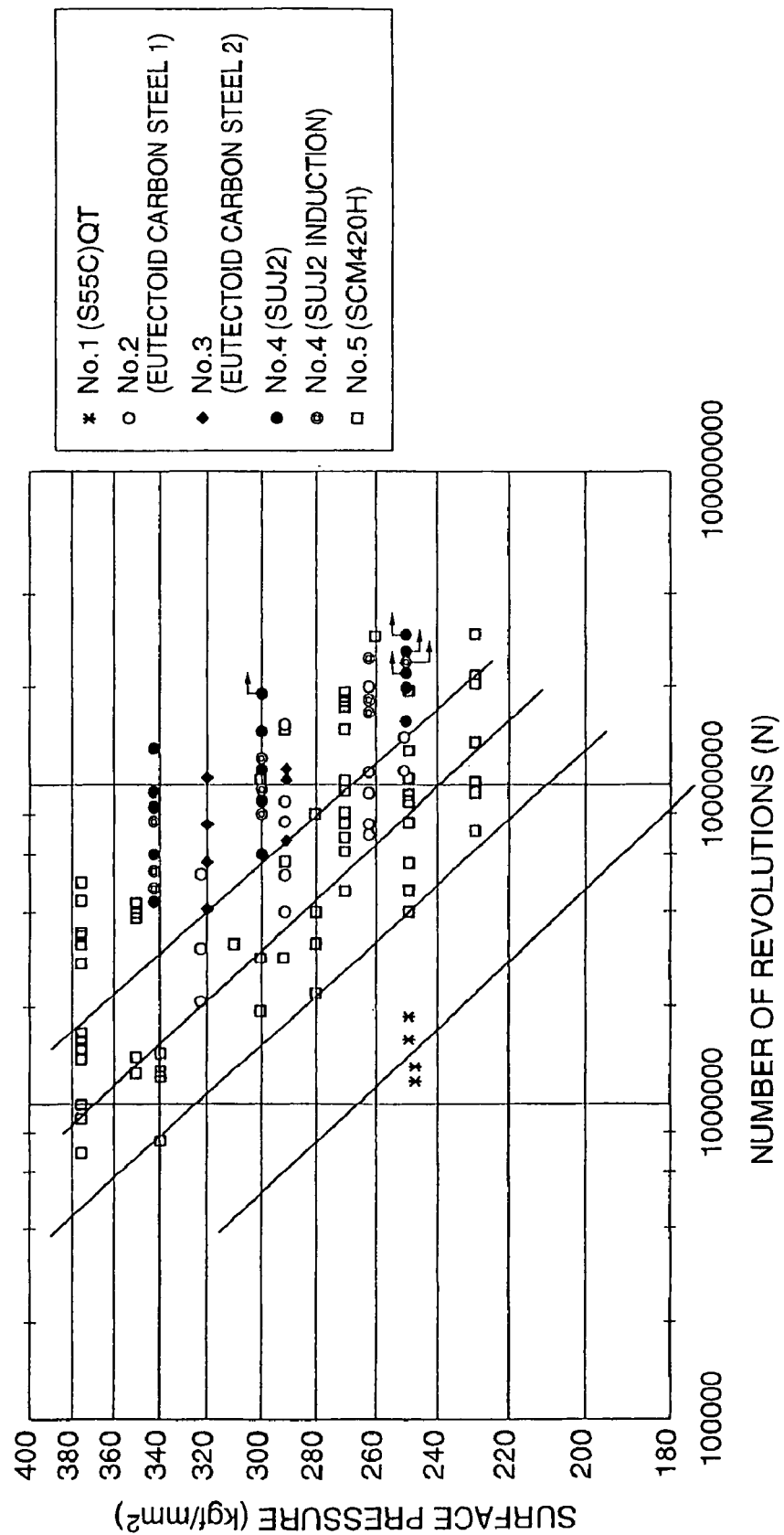
FIG. 14 is a graph showing the number of revolutions of the small roller specimen until one pitting occurs in the small roller specimen under various surface pressures.

FIG. 14 is a graph showing the number of revolutions of the small roller specimen until one pitting occurs in the small roller specimen under various surface pressures (Here, one revolution of a small roller specimen is defined as one time). In the FIG. 14, the abscissa axis shows the number of revolutions until one pitting occurs and the ordinate axis shows a surface pressure at which pitting occurs first. In the figure, a life duration line, which is formed by connecting the minimum number of revolutions in which one pitting occurs in a reference carburized and quenched case hardened steel (No. 5) at each surface pressure, is represented. In a case where a surface pressure at which the number of revolutions until one pitting occurs first is $10^7$ times is defined as rolling surface fatigue strength (pitting strength), it is found that the pitting strength was about 210 kgf/mm². In the same applied as the case above, pitting strengths of each steel is the following; No. 1; 175 kgf/mm², No. 2; 240 kgf/mm², No. 3 (induction heating); 260 kgf/mm², No. 4; 270 kf/mm² and No. 4 (induction heating); 290 kgf/mm². From the results, it is found that rolling surface fatigue strength of each Nos. 3 and 4, in which cementite particles were dispersed in a content of about 2% by volume and about 10% by volume, respectively, were significantly improved. And, the carburized and quenched case hardened steel varied in rolling surface strength widely, because of a grain boundary oxidization at the rolling surface by carburization, an insufficiently quenched layer and also a large amount of retained austenite. However, when compared using an average number of revolutions until one pitting occurs first, pitting strength each of Nos. 3 and 4 was not different from that of No. 2.

And, a half bandwidth of X-ray of martensite phase of a rolling surface at which pitting occurred first was measured. As the result, the bandwidth of each steel is the following; No. 1; 3.6 to 4.0?, No. 2; 4 to 4.2?, No. 3; 4.2 to 4.4?, No. 4; 4.3 to 4.6? and No. 5; 4 to 4.2?.

When the aforesaid heat treated specimens Nos. 1 to 5 were tempered at 250 to 350° C. for 3 hours, the half bandwidth of X-ray of each specimen was measured. As a result, the measured half bandwidth of X-ray of the rolling surface at which pitting occurred was well agreed with that of each of the specimens Nos. 1 to 5 tempered at 300° C. And, the measured half bandwidth was well satisfied with the relationship between tempering hardness and half bandwidth of each carbon steel having various carbon concentrations. This is described in a public literature (for example, Material, Volume 26, No. 280, p 26.)

As a result, a quench hardened layer, in which a martensite parent phase which forms a solid solution with carbon of 0.4 wt % or more and contains cementite particles dispersed therein in a content of 2% or more by volume, more preferably 6% or more by volume, has excellent surface pressure strength. And, an induction hardening method in which cementite particles remain in a bearing, a bearing retainer, a shaft which is rolled with a bearing, and a gear, is preferred.

Example 2

Induction Hardening Condition

No. 1 steel (correspondent to No. 4 SUJ2 steel in table 1) in table 2 was subjected to a cementite spheroidizing treatment (a slow cooling method), in which the steel was heated to 810° C. for 2 hours and slow cooled down to 600° C., and after induction heated up to various temperatures within a range of 800 to 1050° C. at a heating rate of 6° C./sec, the steel was water quenched. And then, the quench hardened layer of the steel was examined in hardness, a carbon concentration in martensite and an amount of dispersed cementite which does not form a solid solution. The carbon concentration is obtained by analysis using X-ray analyzer, and the amount of dispersed cementite which does not form a solid solution is obtained by calculating using the carbon concentration. FIG. 13A is a graph showing a relation between the heating temperature and the hardness. FIG. 13B is a graph showing a relation between the heating temperature and the carbon concentration. FIG. 13C is a graph showing a relation between the heating temperature and the amount of dispersed cementite. The graphs show that, in order to obtain martensite having sufficient hardness necessary for a rolling member and a gear by concentrating (about 7.8 wt %) Cr in cementite, it is preferable that a heating temperature is set at a range within 900 to 1100° C., as described above. In such a case, it is necessary that the martensite contains carbon of about 0.35 to 0.8 wt % and hard cementite dispersed therein in 2 to 10% by volume. In order to increase pitting strength of a rolling surface of a gear, it is more preferable that martensite in the rolling surface contains carbon of 0.4 to 0.8 wt %. And, in order to produce a gear having excellent pitting strength higher than a carburized gear, according to the present invention, it is preferable to adjust hardness of the rolling surface, which is tempered at a low temperature of 100 to 350° C., so as to have hardness of Hv650 or more.

TABLE 2

| | COMPOSITIONS OF STEELS (wt %) | | | | | |
|---|---|---|---|---|---|---|
| | C | Si | Mn | Ni | Cr | Mo |
| No. 1 | 0.98 | 0.27 | 0.48 | | 1.47 | |
| No. 2 | 0.98 | 0.55 | 1.11 | | 1.08 | |
| No. 3 | 0.58 | 0.78 | 0.37 | 0.07 | 1.00 | 0.15 |

A broken line in FIG. 13B represents a concentration of carbon which forms a solid solution with martensite, which is obtained by calculating using the relation shown in FIG. 5. This is well agreed with measured concentrations under 950° C. However, as a heating temperature becomes higher than an austenitizing temperature of 950° C., measured concentrations of carbon which forms a solid solution with martensite becomes larger than the calculated concentrations. Because, a heating rate in this example is slow, whereby a solid solution formation of cementite is promoted according an alloy element diffusion rate controlled step. In order to correctly regulate a concentration of carbon in the martensite phase which is formed by austenitizing at 950° C. or more, more preferably 900° C. or more, it is preferable that a total period of a period for raising a temperature from Ac1 temperature or Ac3 temperature to an austenitizing temperature within a range of 900 to 1100° C. and a period for holding the temperature until a cooling is started is within 5 seconds. In addition, in order to form the first quench hardened layer along the teeth profile, it is preferable that the total period is within 2 seconds.

No. 2 test steel (corresponded to SUJ3, Cr in cementite; about 6.5 wt %) containing a decreased amount of Cr in table 2 was subjected to a cementite spheroidizing treatment (a slow cooling method), as described above. And, another No. 2 test steel was maintained at 820° C. for 1.5 hours and then cooled so as to disperse pearlitely cementite and granulated cementite therein. The both of No. 2 test steels were heated up to various temperatures within a range of 900 to 1100° C. at a heating rate of 1000° C./sec faster than a conventional induction heating rate and then quenched. And, the both of the No. 2 test steel were examined in a structure of a rolling surface of the test thereof.

Figure 15:
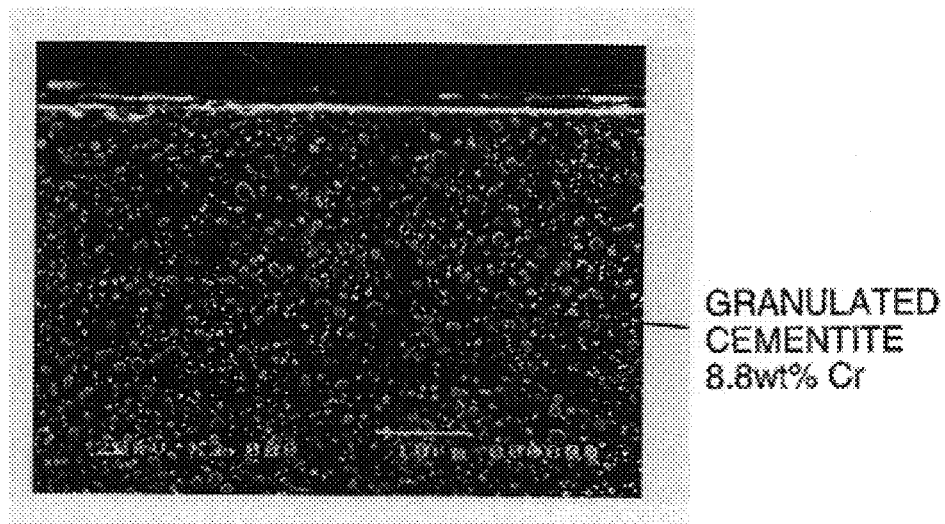
FIG. 15 is a photograph showing a structure of the induction heated No. 4 test steel.

FIG. 15 is a photograph showing a structure of the No. 4 test steel which is subjected to the cementite sheroidizing treatment (a slow cooling method) and then quenched from an austenitizing temperature of 1000° C. The photograph shows that granulated cementite is dispersed in a large amount. And, as shown in FIG. 16, a quenched layer is hardened so as to have maximum hardness of Hv880 (at 1000° C.) although the quench layer contains retained austenite remaining in a content of 30 to 45% by volume. When an austenitizing temperature is set at 1100° C., the quenched layer is hardened so as to have hardness of Hv830 although the quench hardened layer contains retained austenite remaining in a content of 50% by volume. Accordingly, such steels can be used without problems.

Figure 17:
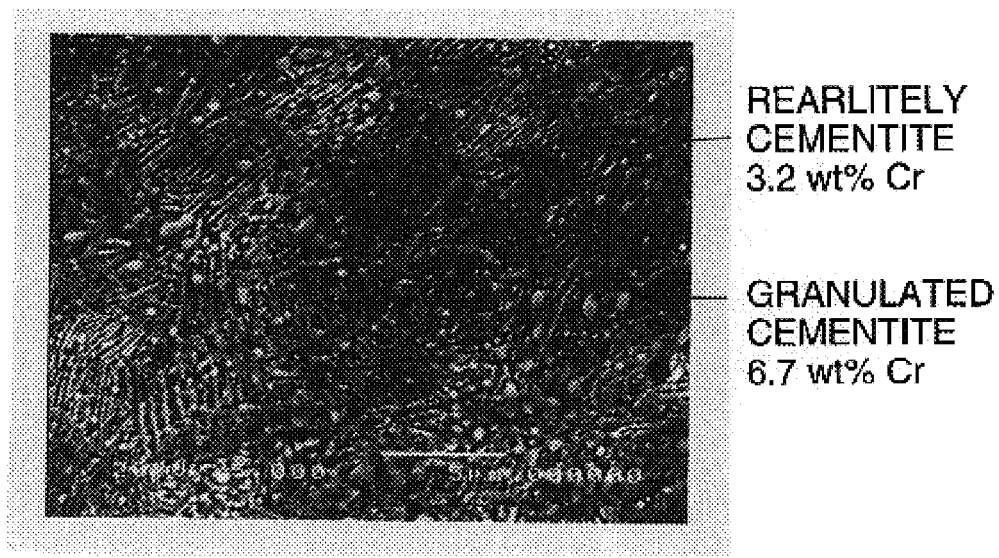
FIG. 17 is a photograph showing a structure of a rolling surface of No. 4 steel containing pearlitely cementite and granulated cementite dispersed therein.

FIG. 17 is a photograph showing a structure of a rolling surface of No. 4 steel containing pearlitely cementite (Cr of 3.9 wt %) and granulated cementite dispersed therein, which is heated up to 1000° C. and then quenched. The photograph shows that martensite parent phase contains pearlitely cementite dispersed therein. And, a concentration of carbon, which forms a solid solution with martensite, increases (carbon of 0.87 wt %) remarkably as shown by the relation of FIG. 5, and therefore the quench hardened layer is hardened so as to have hardness (Hv940) higher than hardness (Hv880) of the quench hardened layer of FIG. 15.

No. 2 steel containing pre-pearlite portions in Table 2 is used for examining a relation between a heating rate and a heating temperature when pearlitely cementite was dispersed. As a result, even when the steel was quenched to a heating temperature of 900° C. at a heating rate of 150° C./sec, the steel contained pearlitely cementite dispersed therein, and therefore the quench hardened layer was hardened so as to have hardness of Hv945. In order to disperse pearlitely cementite in an amount of about at least 4 wt % stably, when the lower limit of a heating temperature is set at 850° C., a heating rate is preferably 100° C./sec or more. And, when the lower limit of a heating temperature is set at 900° C., a heating rate is preferably 150° C./sec or more.

Figure 18:
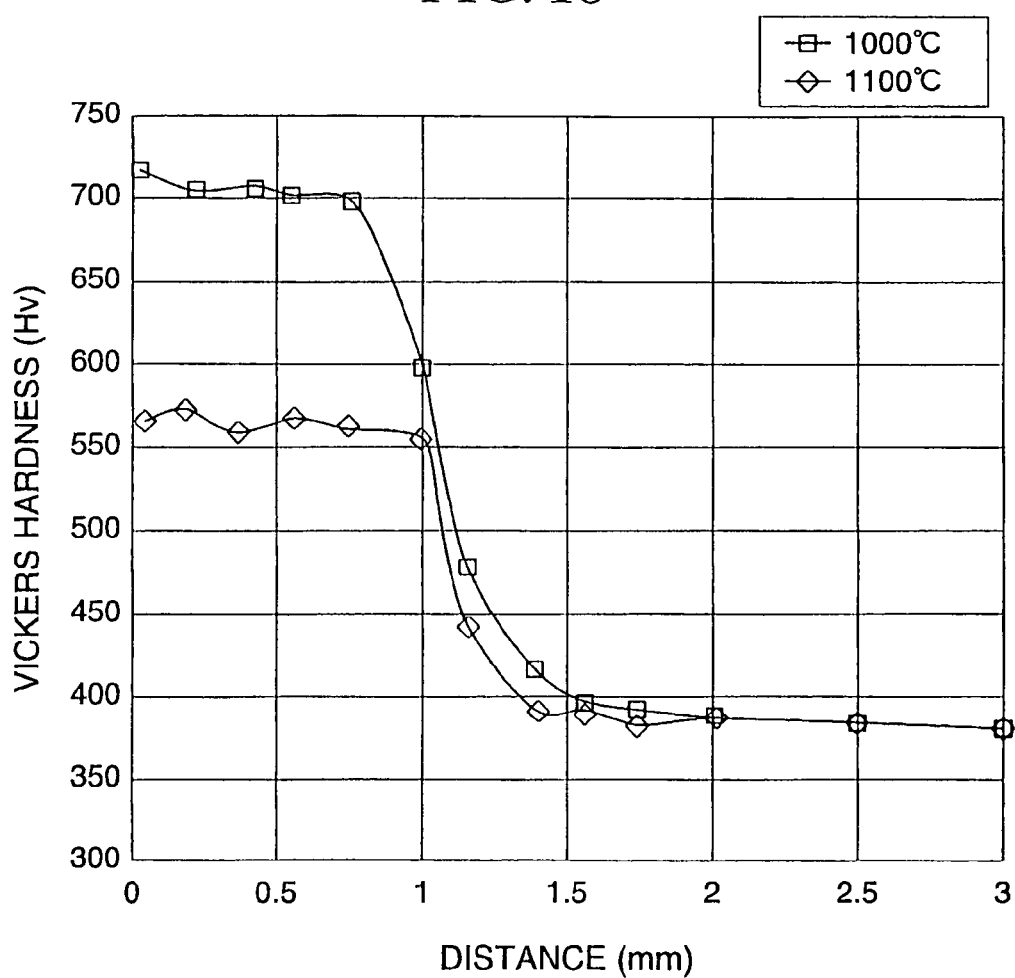
FIG. 18 is a graph showing a distribution of hardness of each of the No. 3 steels in the depth direction.

No. 3 steel in Table 2 was homogenized at 950° C. for 1 hour and then oil quenched, and after being tempered at 700° C. for 2 hours (a concentration of Cr in cementite; about 9.8 wt %), the steel was induction heated and quenched to 1000° C. and 1100° C. at a heating rate of 1000° C./sec and then tempered at 160° C. for 1 hour. FIG. 18 is a graph showing a distribution of hardness of each of the No. 3 steels in the depth direction. Referred to FIG. 5, the No. 3 steel which was quenched from 1000° C. was not hardened sufficiently, because a concentration of carbon which formed a solid solution with martensite was insufficient by about 0.23 wt %. On the contrary, the No. 3 steel which was quenched from 1100° C. was hardened sufficiently, because a concentration of carbon which formed a solid solution with martensite increased to about 0.35 wt %.

As a result of a roller pitting test as with the example 1, the No. 3 steel which was quenched from 1000° had pitting strength of about 200 kgf/mm$^2$, and the No. 3 steel was quenched from 1100° C. had pitting strength of about 240 kgf/mm$^2$ (as shown in FIG. 14). Accordingly, it is necessary that martensite, which forms a solid solution with carbon of 0.35 wt % or more, more preferably 0.4 wt % or more, contains cementite particles dispersed therein.

A concentration of carbon in martensite phase of No. 1 steel (spheroidized SUJ2) which was rapidly heated and quenched was about 0.48 wt % obtained using a lattice parameter of the martensite phase. This is well agreed with a concentration (0.46 wt %) of carbon which forms a solid solution with martensite phase, in which the concentration is obtained by a concentration (7.8 wt %) of Cr in cementite of FIG. 5. Accordingly, the rapidly induction heating and quenching allows a concentration of carbon which forms a solid solution with martensite phase to be adjusted with a high precision. The same is applicable for No. 4 spheroidized SUJ3 (a concentration of Cr in cementite is about 6.5 wt %), in which a concentration of carbon in retained austenite is 0.97 wt % which is substantially equal to a concentration of carbon in austenite phase having the same Cr concentration as that in cementite in FIG. 4. Accordingly, an induction heating condition for adjusting a concentration of carbon which forms a solid solution with martensite phase is preferably such a condition that a heating temperature is 850 to 1100° C. and a heating rate is 100° C./sec or more. And, in order to adjust the solid soluble concentration of carbon more correctly, it is preferable that the lower limit of a heating temperature is 900° C. (almost Ac transformation temperature of iron) and a heating rate is 150° C./sec or more. Alternatively, it is also preferable to be heated 900 to 1150° C. within 2 seconds and then quenched.

And, when a quenching temperature is under about 950° C., an effect of a heating rate decreases because of a slow diffusion velocity of Cr. Accordingly, a slowly induction heating allows adjusting a solid soluble concentration of carbon with martensite phase, dispersing cementite which forms a solid solution, suppressing hardenability and making old austenite crystal grain to be fine grain.

Accordingly, a rolling member such as a gear which has a first quench hardened layer and a second quench hardened layer can be produced by heating up to an austenitizing temperature (2) within a range of Ac1 temperature or Ac3 temperature to 950° C. in combination with heating up to an austenitizing temperature (1) within a range of 900 to 1150° C., and then quenching. For example, Type A; a surface layer of a raw gear is induction heated along the teeth profile to an austenitizing temperature (1) and then the temperature is dropped down to an austenitizing temperature (2) by decreasing the induction power, and quenched, and Type B; a raw gear is heated up to an austenitizing temperature (2) through a deeper portion of the teeth and then rapidly heated the surface layer along the teeth profile up to an austenitizing temperature (1), and quenched.

In the type A, by adjusting a temperature dropping rate from an austenitizing temperature (1) to an austenitizing temperature (2), a concentration of carbon contained in martensite in an intermediate layer between the first and second quench hardened layers is smoothly adjusted. And, a distribution of an austenitizing temperature (2) of the quench hardened layer in the depth direction thereof can adjust a concentration of Cr contained in at least either one of martensite phase or bainite phase in the second quench hardened layer.

And, in the type B, a temperature distribution between an austenitizing temperature (1) and an austenitizing temperature (2) forms martensite in an intermediate layer in order to form a first quench hardened layer along the teeth profile, it is preferable that ferrite into which an induction power penetrates at a shallow depth thereof is rapidly induction heated. So, compared the type A with the type B, the type A is preferable. And, it is also possible that, in the type B, after heating up to an austenitizing temperature (2), the raw gear is cooled down to A1 temperature or less so as to precipitate ferrite, and then rapidly induction heated along the teeth profile up to an austenitizing temperature (1). However, in such a case, a specific second quench hardened layer is not formed at a deeper portion under a first quench hardened layer. As a result, tensile retained stress is produced at boundaries between the first quench hardened layer and the raw material, causing decreasing surface pressure strength (spalling strength). Therefore, such the method is not preferred.

A frequency for the induction heating is preferably 1 to 10 kHz and 100 to 1000 kHz like a frequency used in a case that the teeth is heated from the bottom land to the top land at once or a frequency for the double induction heating.

In the aforesaid producing method, a heating process for heating up to an austenitizing temperature (2) includes a heating method using a salt bath as well as the induction heating method. In such a case, a raw object is rapidly induction heated up to an austenitizing temperature (1) and then immersed in a salt bath to be heated up to an austenitizing temperature (2), or a raw object is heated by a salt bath and then rapidly induction heated at the surface layer thereof up to an asutenitizing temperature (1). However, a producing method using the induction heating method consistently is preferred from a productive viewpoint.

Example 3

Tempering-Softening Resistance

Table 3 shows compositions of each steel used in this example. Each steel was normalized at 950° C. and after heating at 810 to 870° C. for 30 minutes, it was cooled in water and then tempered at 250, 300 and 350° C. for 3 hours. Then, each steel was examined in Rockwell hardness HRC. And, an effect of an addition amount of each alloy element on the hardness was analyzed.

TABLE 3

| | COMPOSITIONS OF STEELS (wt %) | | | | | | | | |
|---|---|---|---|---|---|---|---|---|---|
| TPNo. | C | Si | Al | Mn | Ni | Cr | Mo | V | B |
| No. 6 | 0.45 | 1.45 | | 0.46 | | 1.49 | 0.52 | 0.14 | 0.0018 |
| No. 7 | 0.49 | 1.45 | | 0.46 | | 1.01 | 1.03 | 0.15 | 0.0019 |
| No. 8 | 0.47 | 0.31 | | 0.46 | | 2.01 | 1.03 | 0.15 | 0.0019 |
| No. 9 | 0.49 | 0.29 | | 0.45 | | 1.5 | 1.49 | 0.23 | 0.0019 |
| No. 10 | 0.36 | 1.77 | | 0.6 | | 0.62 | 0.11 | | 0.0026 |
| No. 11 | 0.45 | 0.95 | | 0.66 | 0.01 | 1.29 | 0.5 | | 0.0029 |
| No. 12 | 0.39 | 0.93 | | 1.02 | 0.08 | 0.97 | 0.95 | 0.5 | |
| No. 13 | 0.43 | 0.26 | | 0.44 | | 1.01 | 0.48 | | 0.001 |
| No. 14 | 0.47 | 0.25 | | 0.4 | | 1.01 | 1.05 | | 0.0018 |
| No. 15 | 0.46 | 1.5 | | 0.4 | | 1 | 0.51 | | 0.002 |
| No. 16 | 0.45 | 0.24 | | 0.4 | | 1.02 | 0.48 | 0.31 | 0.0011 |
| No. 17 | 0.45 | 1.46 | | 0.39 | | 0.96 | 0.98 | | 0.001 |
| No. 18 | 0.41 | 0.25 | | 0.35 | | 1 | 0.49 | | 0.0017 |
| No. 19 | 0.52 | 2.3 | | 0.57 | | 0.11 | | | |
| No. 20 | 0.98 | 0.27 | | 0.48 | | 1.47 | | | |
| No. 21 | 0.55 | 0.23 | | 0.71 | | | | | |
| No. 22 | 0.77 | 0.21 | | 0.74 | | | | | |
| No. 23 | 0.45 | 0.21 | 1.26 | 0.53 | | 1.51 | 0.21 | | |
| No. 24 | 0.6 | 0.25 | 0.97 | 0.93 | 0.98 | 1.04 | 0.35 | | |

As a pre-test, a carbon steel containing carbon of 0.1 to 1.0 wt % and Mn of 0.3 to 0.9 wt % was examined in the same manner described above for a reference steel. As a result, the hardness can be expressed by the following approximate expressions, $HRC = 34 \times \sqrt{carbon(wt\%)} + 26.5$ at 250° C.

$HRC = 36 \times \sqrt{carbon(wt\%)} + 20.9$ at 350° C.

$HRC = 38 \times \sqrt{carbon(wt\%)} + 15.3$ at 350° C.

And, as a result of analyzing the effect of each steel based on the hardness of the reference carbon steel, tempering-softening resistance ΔHRC can be expressed by the following equation, $$\Delta HRC=4.3\times Si(wt\%)+7.3\times Al(wt\%)+1.2\times Cr(wt\%)\times(0.45/carbon(wt\%))+1.5\times Mo(wt\%)+3.1\times V(wt\%).$$

From the result, Al has tempering-softening resistance 1.7 times that of Si and therefore is very effective for improving surface pressure strength of a rolling surface.

Figure 19:
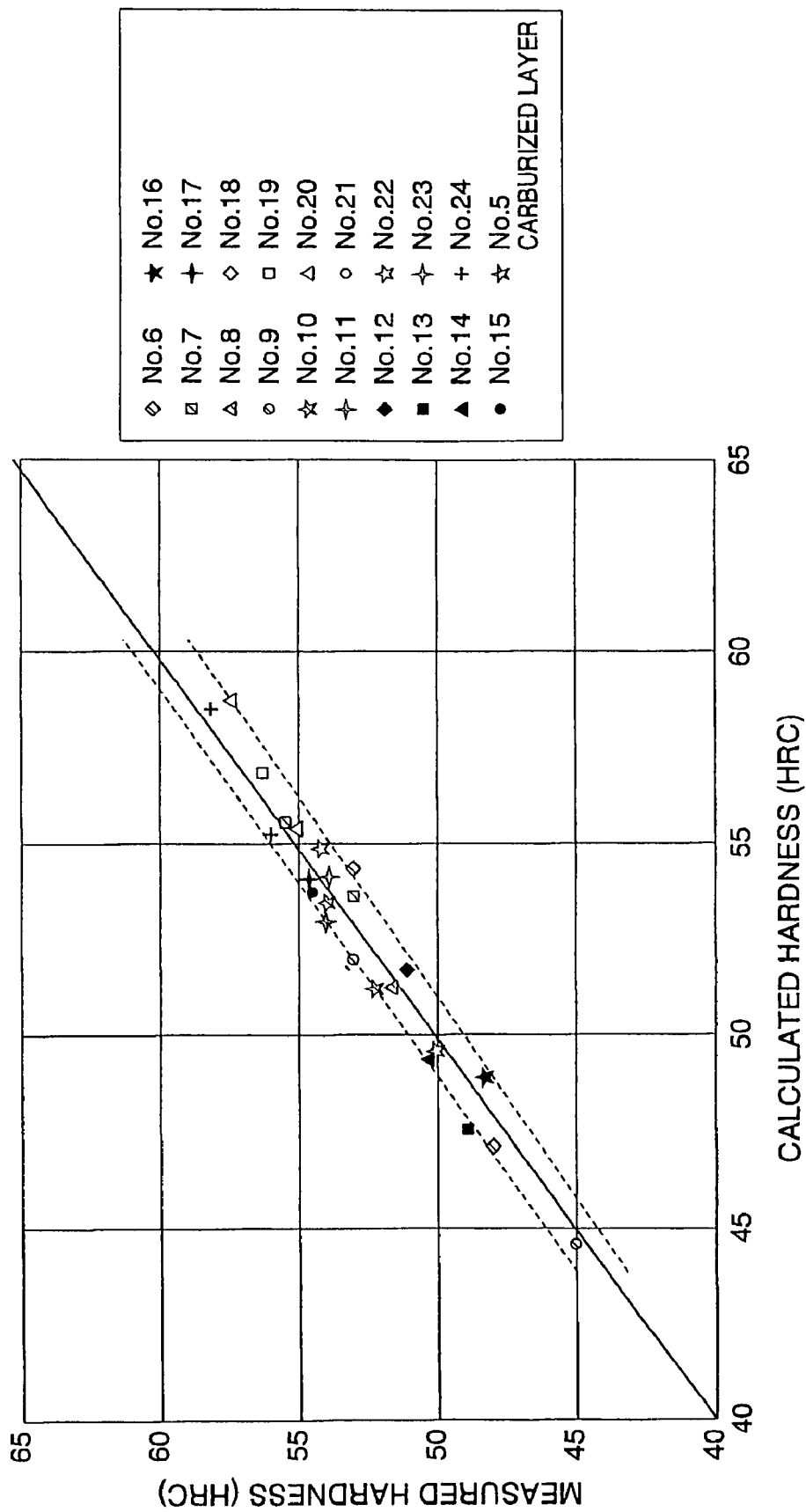
FIG. 19 is a graph showing a relation between tempering hardness obtained by the analysis and measured tempering hardness.

FIG. 19 is a graph showing a relation between tempering hardness obtained by the analysis and measured tempering hardness. From the figure, both of the hardnesses are well agreed within error span of HRC±1. In FIG. 19, tempering hardness (at 300° C.) of a carburized layer (0.8 wt % carbon) of SCM420 (No. 5) in the example 1 is represented by ☆. The result is well agreed with the calculated hardness.

Example 4

Induction Hardenability

Figure 20:
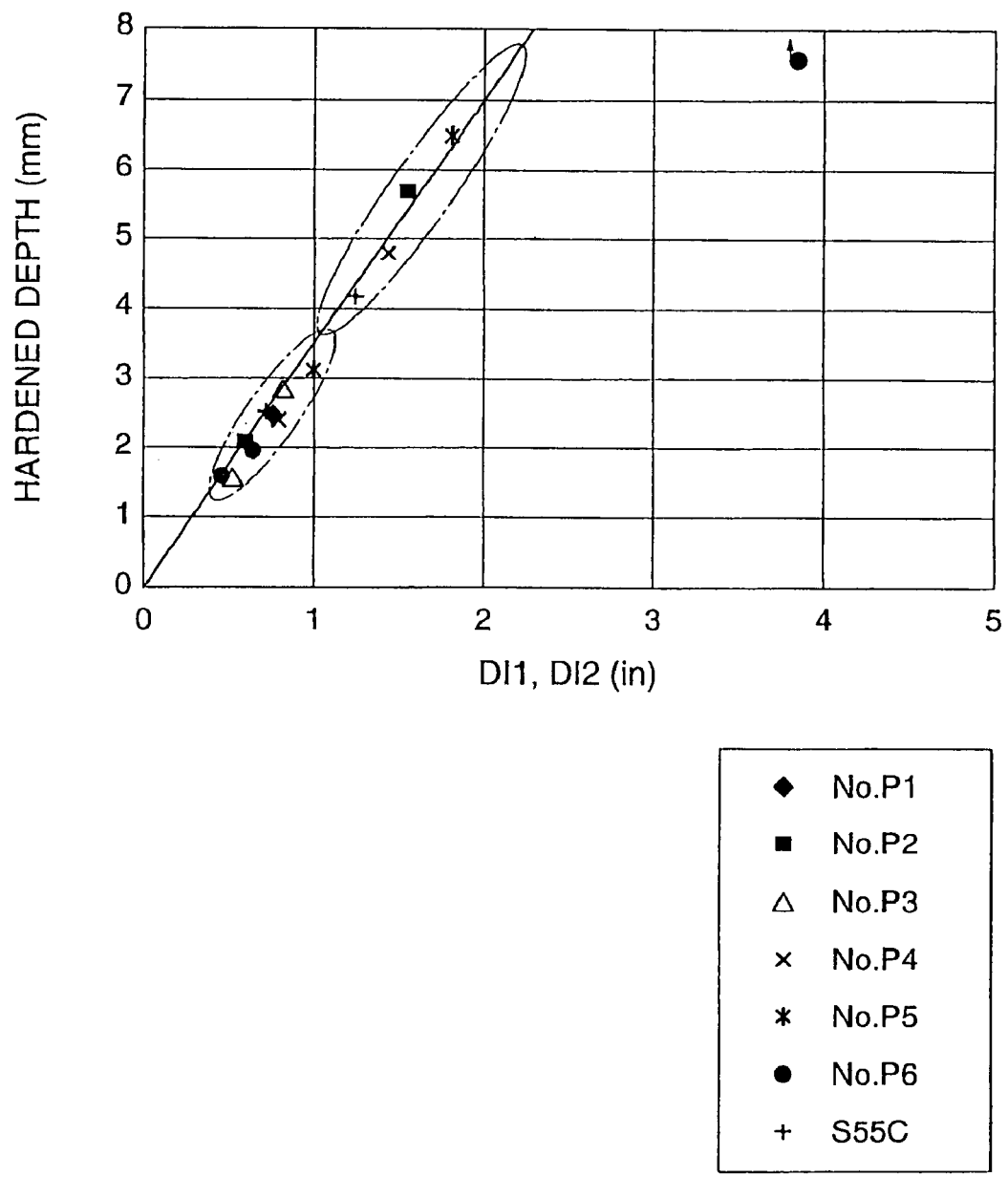
FIG. 20 is a graph showing a relation between a DI value 1 and a DI value 2, and the depth of the quench hardened layer.

Table 4 shows compositions of steels used in this example. Each steel was normalized at 950° C. and then machined to be a columnar shape specimen with a diameter of 30 mm and a length of 100 mm. Then, one group of the specimens was heated at 850 to 900° C. for 1 hour and then water quenched. And, another group of the specimens was heated at 850 to 900° C. for 1 hour and after water quenched, was tempered at 650° C. for 5 hours. Then, both of the groups were heated up to 870° C. within 15 seconds by using an induction heating device of 3 kHz and then water quenched. Then, a depth of the quench hardened layer of each specimen was measured. FIG. 20 is a graph showing a relation between a DI value 1 obtained by using the compositions shown in FIG. 4 and a DI value 2 obtained by calculation using the composition of martensite tempered at 650° C., and the depth of the quench hardened layer. This shows that concentrating alloy element in cementite of an unquenched steel decreases hardenability remarkably at an induction heating and also regulates the hardenability correctly. By the way, No. P6 steel in FIG. 20 is not agreed with the relation, because cementite in the unquenched steel remains in a content of about 10% by volume without forming a solid solution and the cementite contains alloy elements in a larger amount. In addition, a concentration of carbon in martensite decreases, resulting in a decreased DI value 2. And, crystal grain becomes to be fine grain so as to decrease hardenability.

TABLE 4

COMPOSITIONS OF STEELS (wt %)

|        | C    | Si   | Al    | Mn   | Ni   | Cr   | Mo   |
|--------|------|------|-------|------|------|------|------|
| No. P1 | 0.58 | 0.21 | 0.024 | 0.28 |      | 0.16 | 0    |
| No. P2 | 0.58 | 0.11 | 0.024 | 0.28 |      | 0.55 | 0.12 |
| No. P3 | 0.55 | 0.61 | 0.018 | 0.2  |      | 0.19 | 0    |
| No. P4 | 0.7  | 1.18 | 0.019 | 0.22 |      | 0.31 |      |
| No. P5 | 0.61 | 0.09 | 0.51  | 0.26 | 0.51 | 0.31 |      |
| No. P6 | 0.98 | 0.61 | 0.02  | 0.49 | 0.03 | 1.02 |      |
| S55C   | 0.54 | 0.22 | 0.015 | 0.81 |      | 0.12 |      |

Figure 21:
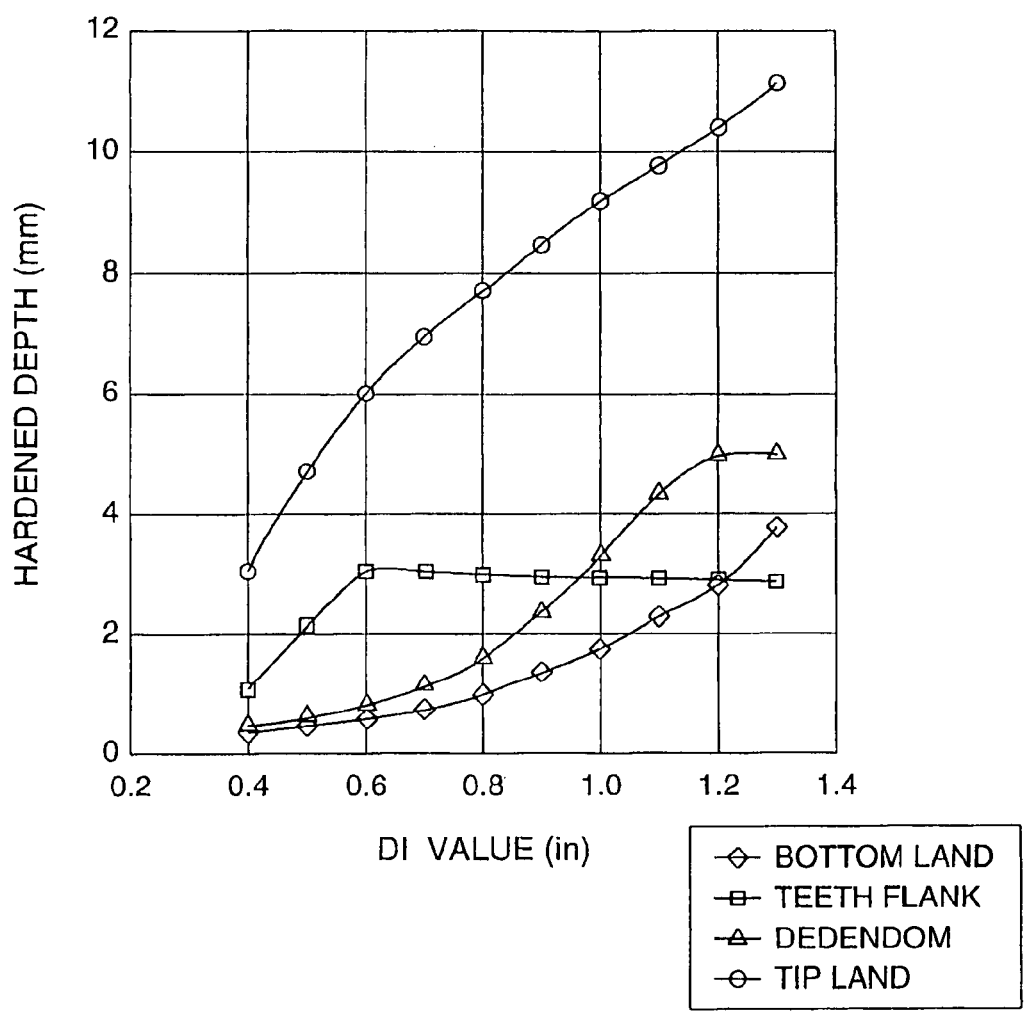
FIG. 21 is a graph showing a relation between a depth of a quench hardened layer and a DI value.

A gear with a module m=3.25 was heated up to 900° C. and then cooled with a cooling ability (4in$^{-1}$) correspondent to a water splay cooling. FIG. 21 is a graph showing a relation between a depth of a quench hardened layer and a DI value 1 each of bottom land (◇), the teeth flank (□) on the circular pitch, the dedendum (△) and the top land (○) of the gear. This figure shows that (1) the hardened layer is through hardened at the teeth flank on the circular pitch in the case of DI=0.6 (in) or more, and (2) the dedendum and the top land have hardened depth of about 30% or more and about 200% or more of the hardened depth on the circular pitch, respectively, before through-hardening. This provides a specific distribution of the hardened depth, in which the hardened depth of the dedendum is shallow with respect to the hardened depth of the top land and teeth flank on the circular pitch. And, as the hardened depth of the top land becomes thicker than the module m, tensile retained stress is produced at the teeth flank from the top land to the vicinity of the dedendum, while compressive retained stress is produced at the dedendum and the bottom land.

Form the result of examining a DI value of the gear each having various module m within 2 to 15(mm) in the same manner as described above, it is necessary that a gear which is through hardened on the circular pitch has hardenability (a DI value) satisfying the following equation, $$DI \geq 0.12 \times m + 0.2.$$

Figure 22:
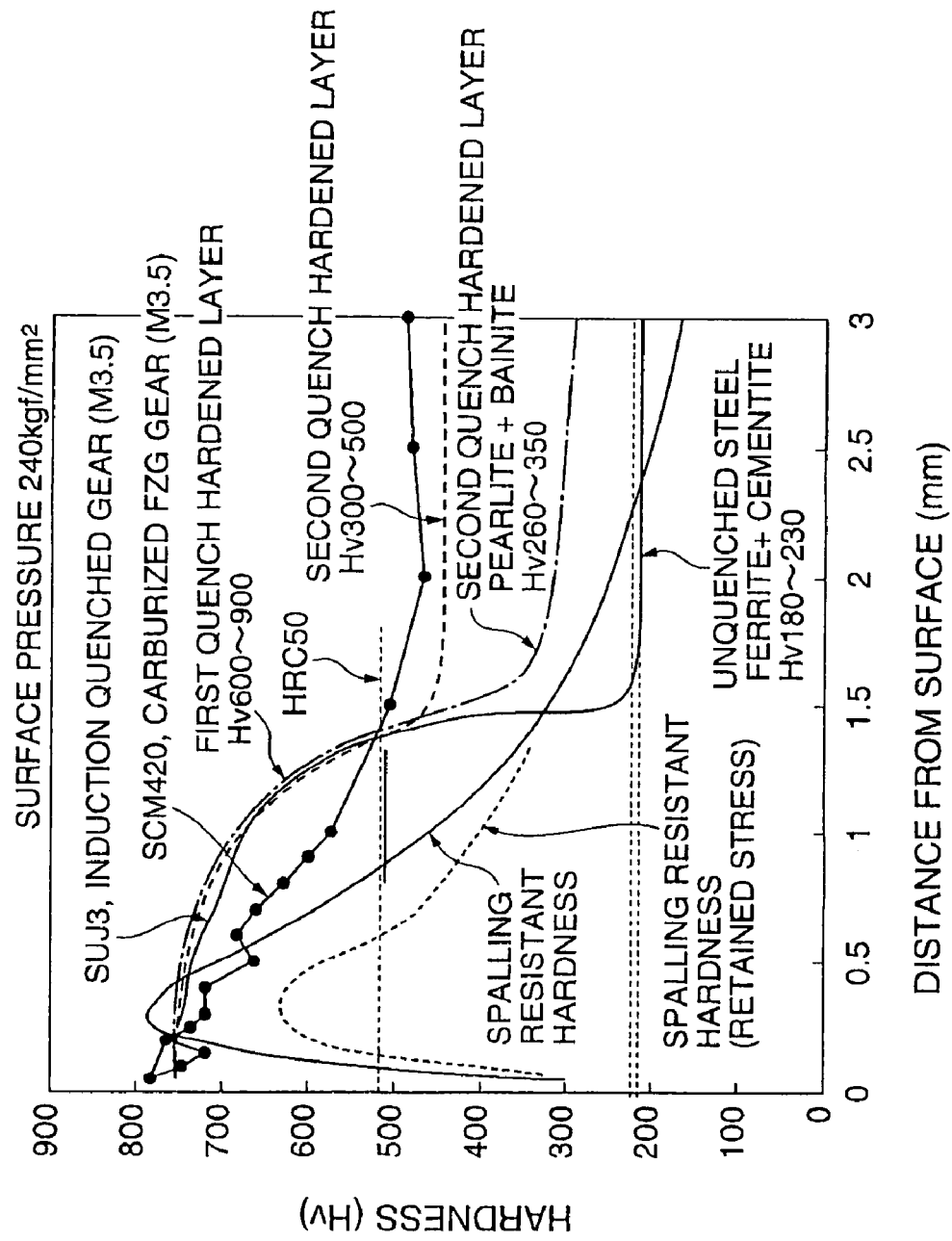
FIG. 22 is a graph showing a distribution of the Vickers hardness in the depth direction.
Figure 23:
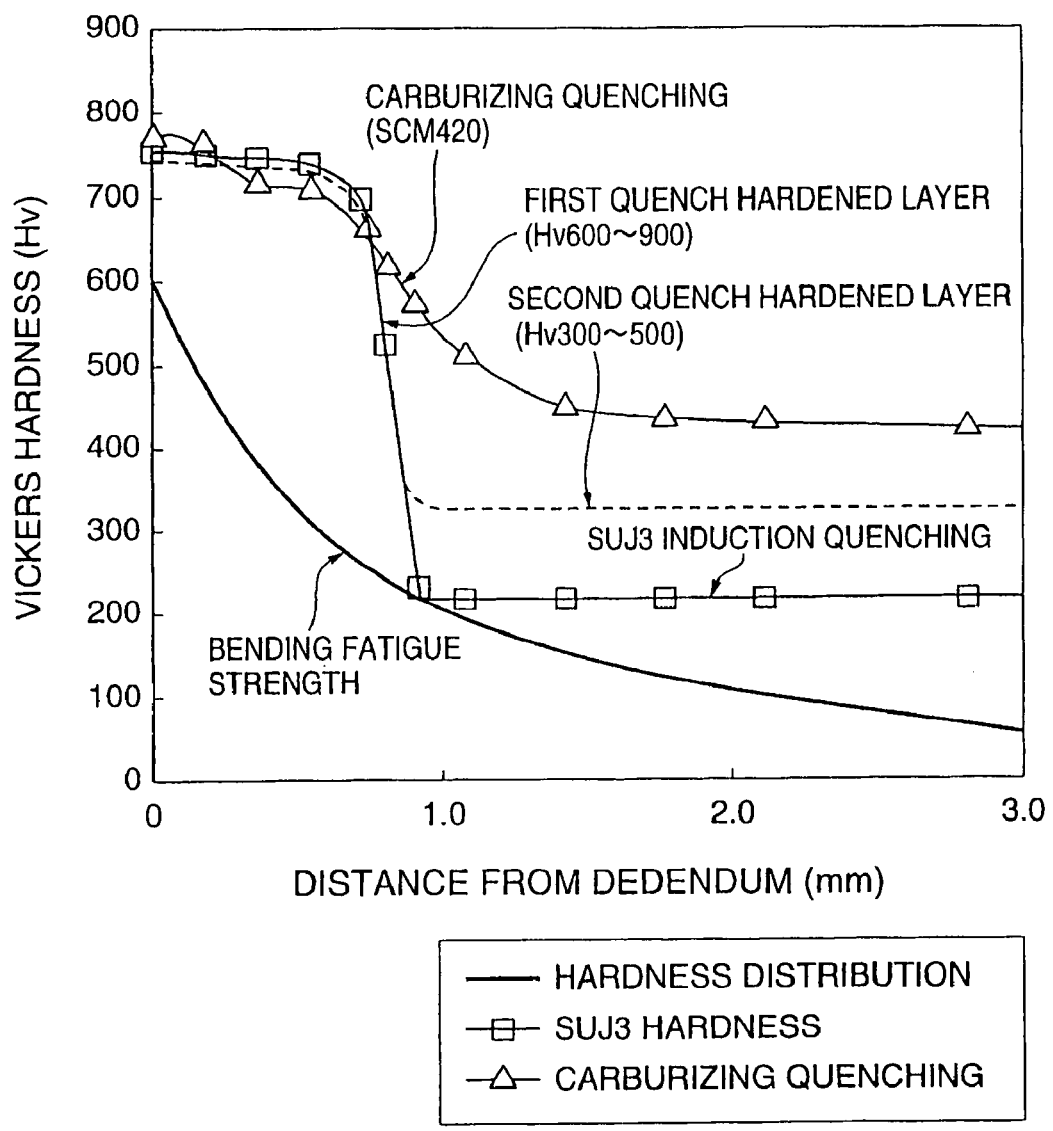
FIG. 23 is a graph showing a distribution of the Vickers hardness in the depth direction.
Figure 24:
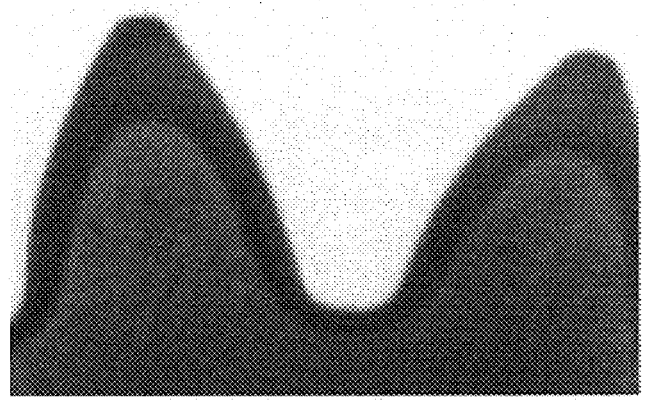
FIG. 24 is a drawing showing a hardening pattern of an induction quenched gear.
Figure 26A:
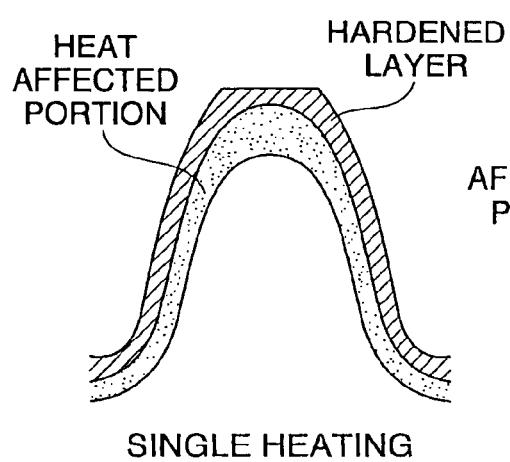
FIG. 26A and FIG. 26B are drawings showing an effect of a double induction heating.
Figure 26B:
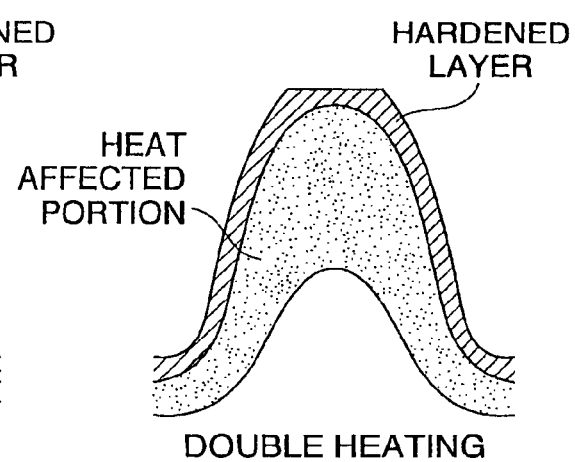

When a gear with a module m=3.5 was applied with Hertz surface pressure of 240 kgf/mm² on the circular pitch, shear stress applied to an internal portion thereof and Vickers hardness (Hv=10.9×shear stress) capable of withstanding spalling strength of the shear stress were measured. FIG. 22 is a graph showing a distribution of the Vickers hardness in the depth direction. And, as a reference example, when the gear was applied with bending stress (100 kgf/mm²) at the surface of the dedendum, stress applied to the internal portion thereof and Vickers hardness (Hv=6×bending stress) capable of withstanding fatigue strength of the stress were measured. FIG. 23 is a graph showing a distribution of the Vickers hardness in the depth direction. In addition, a distribution of the hardness in the depth direction was also measured on a carburized gear made of SCN420 steel and a gear in which spheroidized SUJ3 steel (Hv=210) was induction quenched along the teeth profile. In these figure, each distribution are also shown.

In terms of spalling strength referring to FIG. 22, the gear made of the induction hardened SUJ3 steel is inferior in spalling strength than the carburized gear because of low hardness of the raw material (unquenched steel). In order to obtain the same spalling strength as that of the carburized gear, it is necessary that (1) the depth of the quench hardened layer makes deeper to 3 to 3.5 mm (almost module of the gear), and (2) hardness of the raw material is hardened so as to have hardness of about Hv350. However, when the depth of the quench hardened layer makes deeper, a problem in which tensile retained stress is produced at the teeth flank is raised. And, when the raw material is hardened in the above manner, a problem in processing cost of a gear is raised. In order to solve such problems, it is preferable that a hard second quench hardened layer, represented by a broken line or a dashed line in the figure, is formed at a deeper portion under the first quench hardened layer. The second quench hardened layer, represented by a dashed line, is formed by bainite and pearlite, and another second quench hardened layer, represented by a broken line, is formed by at least either one of martensite or bainite. It is preferable that the second quench hardened layer is formed by at least either one of martensite phase or bainite phase mainly as with a carburized gear. In order to form the second quench hardened layer sufficiently, it is preferable to adjust a DI value of the second quench hardened layer so as to satisfy the following equation, DI≧0.12×m+0.2. In a larger gear, it is preferable that a DI value is adjusted by adding Si, Al, Ni and Co which are not concentrated in cementite.

In the induction hardened gear made of SUJ3 steel, compressive retained stress of 40 kgf/mm² is produced at the teeth flank, while tensile retained stress of 20 to 30 kgf/mm² is produced at boundaries between the quench hardened layer and the raw steel. This raises a problem in decreasing spalling strength lower than a carburized gear. However, in the present invention, since the first and second quench hardened layers are formed, the tensile retained stress can be decreased, therefore improve the spalling strength.

And, it is preferable that the hardness and the depth of the first quench hardened layer are regulated according to the standard hardness (Hv600 to 850) and the standard depth ((0.2 to 0.6)×m) of a carburized gear.

Referring to FIG. 23, in view of bending strength of the dedendum, substantially the same result as that of the spalling strength is applied. That is, it is preferable that the hardness and the depth of the first quench hardened layer satisfy the standard (hardness of Hv600 to 850 and depth of (0.15 to 0.6)×m)) of a carburized gear and hardness of the second quench hardened layer is Hv300 to 500.

Example 5

Abrasion Resistance

Because a conventionally induction hardened rolling member has insufficient abrasion resistance, in this present invention, an effect of dispersion of cementite on abrasion resistance is examined by the roller pitting test of the above example. The roller pitting test was carried out in the same manner as described above. An amount of abrasion is shown by an abraded depth (μm) of the small roller specimen after rotating the small roller specimen 2×10⁶ times with applying a surface pressure of 50 kgf/mm². Table 5 shows compositions of test steels used in this test. In the Table 5, an amount of cementite, an amount of retained austenite and an abraded depth after induction quenching are also shown. This shows that dispersing cementite improves abrasion resistance remarkably. From the result of No. W3, dispersing platy cementite pearlitely has excellent abrasion resistance than dispersing granulated cementite, because oil pocket is formed on the rolling surface accompanied with sliding, causing improvement in lubricating performance. Such structure is suitable not only for a gear but also for a rolling member such as a bearing.

What is claimed is:

1. A rolling member comprising:

a first quench hardened layer which is formed on a surface layer of the rolling member and has a parent phase taking the form of martensite phase containing carbon of 0.35 to 0.8 wt %; and a second quench hardened layer which is formed at a deeper layer under said first quench hardened layer and has a parent phase containing at least either one of martensite phase or bainite phase containing carbon of 0.07 to 0.3 wt % and has a cementite dispersed therein a content of 2 to 20% by volume, wherein said rolling member is made of a steel containing carbon of 0.4 to 1.5 wt % and Cr of 2 wt % or less, and wherein said steel contains one or more elements of Mn of 0.1 to 2 wt %, Si+Al of 0.05 to 1.5 wt %, Mo of 0.7 wt % or less, W of 1.4 wt % or less, V of 2 wt % or less, Al of 1 wt % or less, Ni of 3 wt % or less, B of 0.01 wt % or less, Ti+Nb+Zr of 1 wt % or less and S of 1.0 wt % or less.

2. A rolling member according to claim 1, further comprising an unquenched portion which is formed at a deeper portion under said second quench hardened layer and has a structure in which cementite is dispersed in ferrite.

3. A rolling member according to claim 1, further comprising an intermediate layer between said first and second quench hardened layers, in which said intermediate layer has a hardness value that is between a hardness value of said first quench hardened layer and a hardness value of said second quench hardened layer.

4. A rolling member according to claim 1,
wherein said first and second quench hardened layers are formed by an induction hardening process.

5. A rolling member according to claim 1,
Wherein said steel contains Cr of 0.3 to 2 wt %, and said cementite dispersed in said steel contains Cr of 3-12 wt %.

6. A rolling member according to claim 1,
wherein said rolling member is made of a steel containing carbon of 0.5 to 1.5 wt % and Cr of 0.5 to 2 wt %,
said first quench hardened layer contains cementite dispersed therein in a content of 2 to 17% by volume, and
said second quench hardened layer contains cementite dispersed therein in a content of 4 to 20% by volume.

TABLE 5

COMPOSITIONS OF STEELS (wt %)

|  | C | Si | Al | Mn | Ni | Cr | Mo | CEMENTITE (% BY VOLUME) | ABRADED DEPTH (μm) | RETAINED AUSTENITE (% BY VOLUME) |
|---|---|---|---|---|---|---|---|---|---|---|
| No. W1 | 0.46 | 0.22 | 0.018 | 0.76 |  | 0.8 |  | 1.2 (GRANULAR) | 4.1 | 12 |
| No. W2 | 0.53 | 0.21 | 0.021 | 0.78 |  | 0.98 | 0.16 | 2.5 (GRANULAR) | 2.3 | 17 |
| No. W3 | 0.98 | 0.55 | 0.023 | 1.11 |  | 1.08 |  | 5.8 (GRANULAR) | 0.9 | 35 |
| No. W3 |  |  |  |  |  |  |  | 6.2 (PEARLITELY) | 0.4 | 28 |
| No. W4 | 0.84 | 1.12 | 0.019 | 0.4 |  | 0.91 |  | 5.8 (PEARLITELY) | 0.7 | 33 |
| No. W5 | 0.5 | 0.88 | 0.022 | 0.75 |  | 0.12 |  | 0 | 8.9 | 7 |
| S55C | 0.55 | 0.23 | 0.025 | 0.71 |  |  |  | 0 | 12 | 5 |
| S80C | 0.79 | 0.22 |  | 0.75 |  | 0.13 |  | 0 | 7.3 | 12 |
| SCM420 CARBURIZING QUENCHING |  | 0.23 | 0.024 | 0.78 |  | 1.01 | 0.17 | 0 | 3.8 | 23 |

7. A rolling member according to claim 1,
wherein said first quench hardened layer contains retained austenite dispersed therein in a content of 10 to 50% by volume.

8. A rolling member according to claim 1,
wherein said first quench hardened layer contains one or more compounds dispersed therein selected from the group consisting of $V_4C_3$, TiC, NbC and ZrC.

9. A rolling member according to claim 1,
Wherein said steel contains Si+Al of 0.5 to 1.5wt % and further one or more elements of Mn of 0.1 to 2 wt %, Ni of 3 wt % or less, Mo of 9.05 to 0.7 wt %, V of 0.2 to 1 wt %, and Ti+Nb+Zr of 0.1 to 0.5 wt %.

10. A rolling member according to claim 1,
wherein said rolling member is a gear having teeth and a circular pitch, said rolling member being formed with said first quench hardened layer having a depth within 0.15 to 0.6 times a module of said gear on the circular pitch and said second quench hardened layer having Vickers hardness of Hv260 to 500 at a deeper portion under said first quench hardened layer or at a center internal portion of the teeth.

11. A rolling member according to claim 1,
wherein said rolling member is a bearing or a cam shaft.

12. A rolling member according to claim 1,
wherein said first quench hardened layer or both of said first and second quench hardened layers are tempered at 100 to 350° C.

13. A rolling member according to claim 1,
wherein said first quench hardened layer is worked at a surface layer thereof so as to provide compressive retained stress of 50 kgf/mm$^2$ or more thereto.

* * * * *